United States Patent [19]

Soeya et al.

[11] Patent Number: 5,668,685
[45] Date of Patent: Sep. 16, 1997

[54] MAGNETIC DISC APPARATUS

[75] Inventors: Susumu Soeya, Hitachiota; Shigeru Tadokoro; Takao Imagawa, both of Hitachi; Eiji Ashida, Hitachiota; Moriaki Fuyama; Hiroshi Fukui, both of Hitachi; Saburo Suzuki, Minamiashigara; Masayuki Takagi, Odawara; Shinji Narishige, Mito, all of Japan

[73] Assignee: Hitachi, Ltd., Tokyo, Japan

[21] Appl. No.: 351,562

[22] Filed: Dec. 7, 1994

Related U.S. Application Data

[63] Continuation of Ser. No. 22,901, Feb. 26, 1993, abandoned.

[30] Foreign Application Priority Data

Feb. 26, 1992 [JP] Japan ................................ 4-039186

[51] Int. Cl.$^6$ .................................................. G11B 5/127
[52] U.S. Cl. ............................................................ 360/113
[58] Field of Search ................................... 360/113, 110, 360/126; 324/252; 365/8

[56] References Cited

U.S. PATENT DOCUMENTS

| | | | |
|---|---|---|---|
| 4,639,806 | 1/1987 | Kira | 360/113 |
| 4,713,708 | 12/1987 | Krounbi et al. | 360/113 |
| 4,825,325 | 4/1989 | Howard | 360/113 |
| 4,940,511 | 7/1990 | Fontana, Jr. et al. | 360/113 |
| 5,218,497 | 6/1993 | Tanabe et al. | 360/126 |
| 5,329,413 | 7/1994 | Kondoh et al. | 360/113 |

FOREIGN PATENT DOCUMENTS 4285713  10/1992  Japan.

*Primary Examiner*—Stuart S. Levy
*Assistant Examiner*—Allen Cao
*Attorney, Agent, or Firm*—Antonelli, Terry, Stout & Kraus, LLP.

[57] ABSTRACT

A magnetic disc apparatus is disclosed, in which a magneto-resistance effect film converts a magnetic signal into an electrical signal by use of the magneto-resistance effect, a pair of electrodes supplies a signal detection current to the magneto-resistance effect film, and a magnetic domain control layer controls the magnetic domain of the magneto-resistance effect film. The magneto-resistance effect film, the electrodes and the magnetic domain control layer constitute a magnetic head of magneto-resistance effect type. An isolation film is formed in a magneto-sensitive portion of the magneto-resistance effect film between the magneto-resistance effect film and the magnetic domain control layer to break the magnetic coupling between the magneto-resistance effect film and the magnetic domain control layer.

30 Claims, 12 Drawing Sheets

F I G. 2
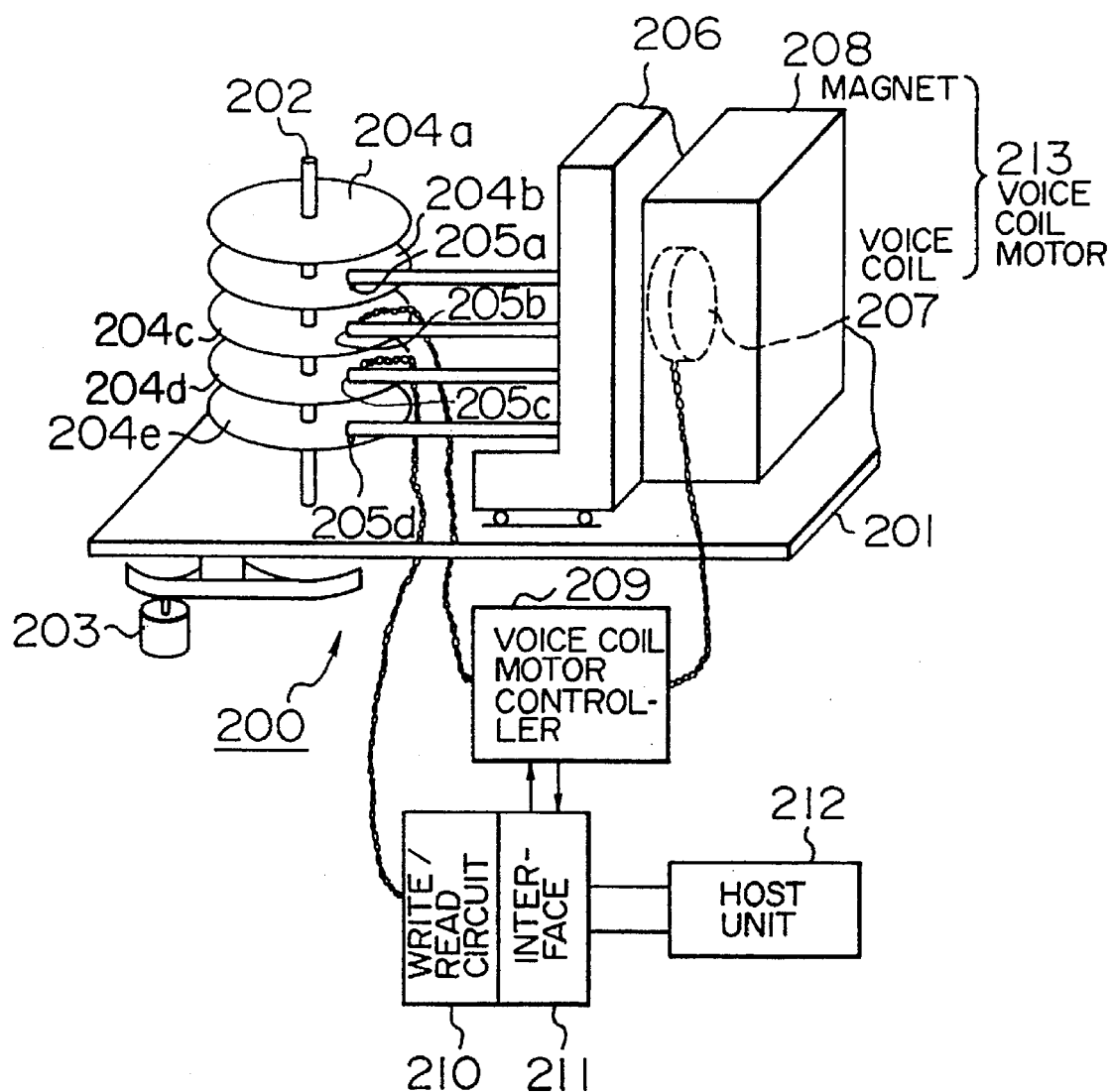

F I G. 3A
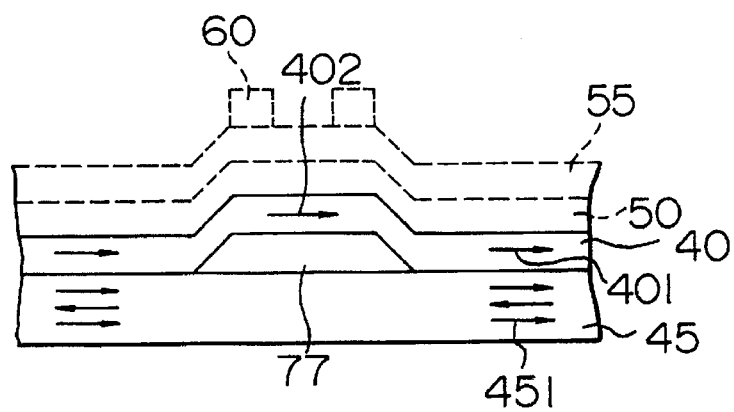
F I G. 3B
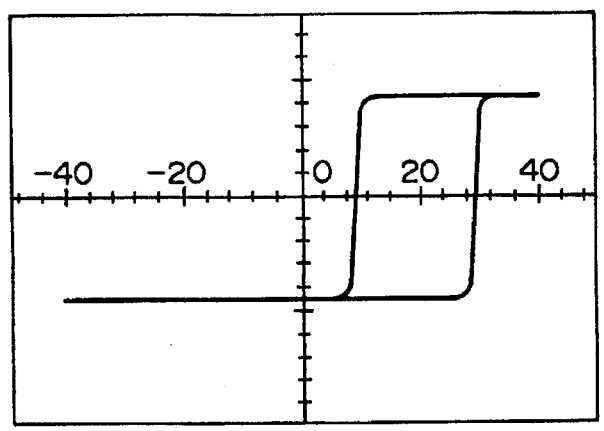
F I G. 3C
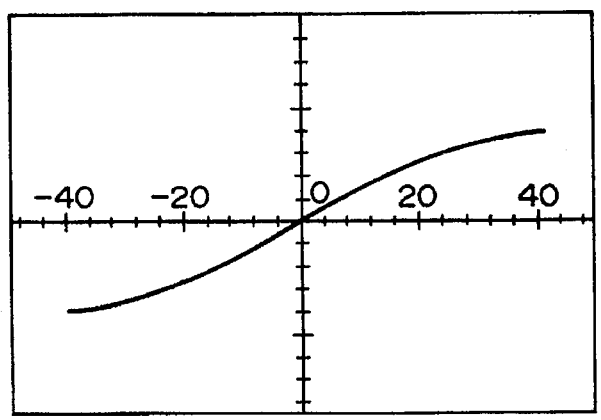

F I G. 10
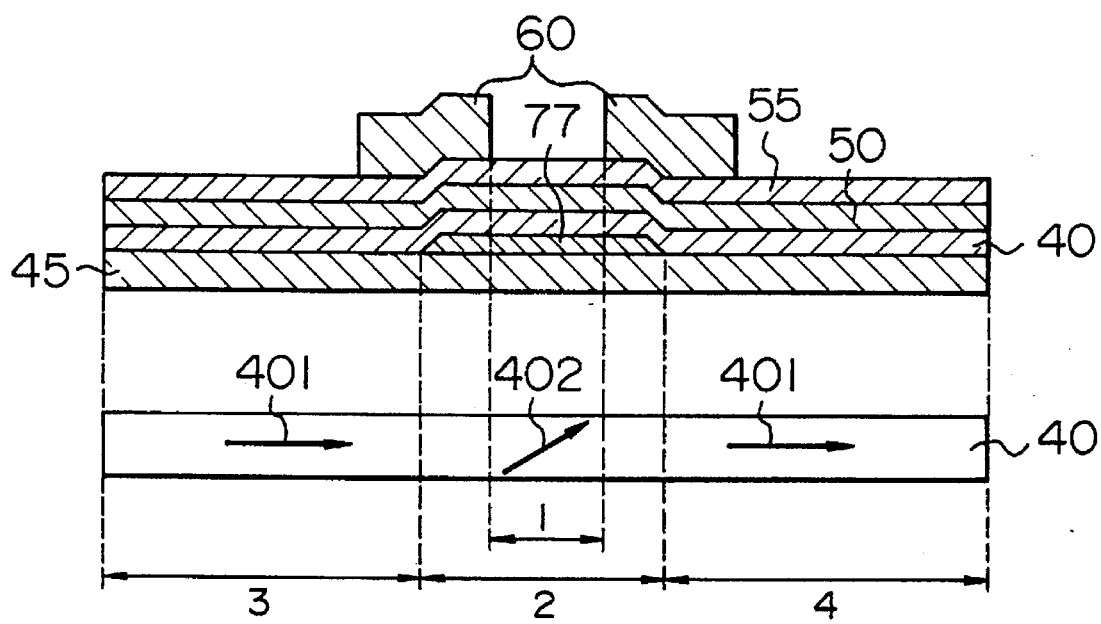
F I G. 11
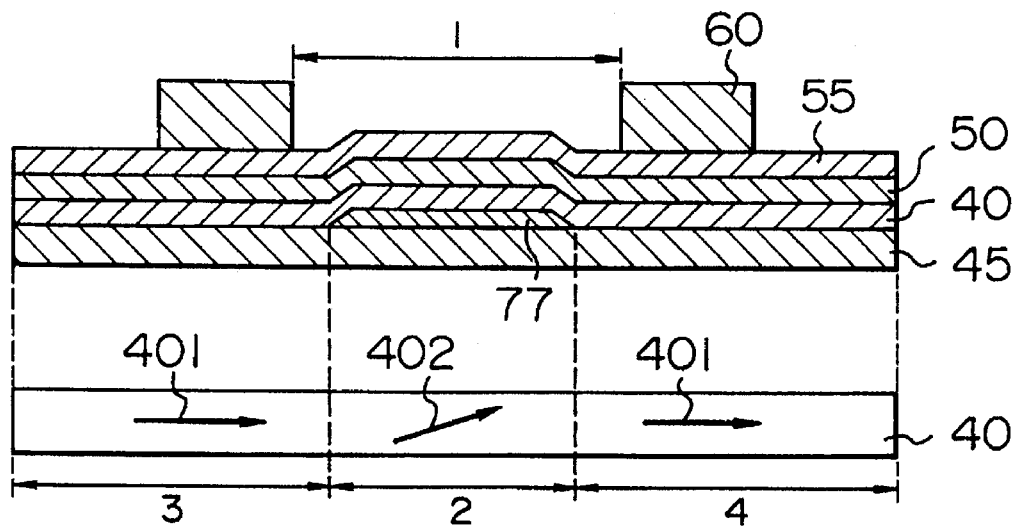

INVENTION

INTEGRATED ELECTRODE TYPE

EXISTENCE OF DOMAIN WALL

MAGNETIC DISC APPARATUS

This application is a continuation of Ser. No. 08/022,901, filed Feb. 26, 1993, now abandoned.

BACKGROUND OF THE INVENTION

The present invention relates to a magnetic disc apparatus for storing information magnetically, or more in particular to a magnetic disc apparatus for reproducing information by use of the magneto-resistance effect.

A magneto-resistance effect film is generally used when reproducing information by use of the magneto-resistance effect. Conventional methods for eliminating the ferromagnetic domain wall which is formed within the magneto-resistance effect film are described below.

According to a method disclosed in U.S. Pat. No. 4,103,315, an antiferromagnetic film is formed over the entire surface of one side of a magneto-resistance effect film, and a magnetic coupling generated in the interface between the antiferromagnetic film and the magneto-resistance effect film (hereinafter referred to as "the magnetic exchange coupling") is used. An Fe—Mn alloy is most effective as the antiferromagnetic film, and may be replaced with nickel oxide or iron oxide with equal effect.

U.S. Pat. No. 4,663,685 (JP-A-62-40610), on the other hand, discloses a method in which a magnetic domain control layer configured of an antiferromagnetic material such as Fe—Mn alloy is formed at the upper ends of a magneto-resistance effect film, and the magnetic exchange coupling generated in the interface between the antiferromagnetic film and the magneto-resistance effect film is utilized.

Also, Journal of Applied Physics, Vol. 52, p. 2465, 1981, discloses the fact that the phenomenon of a reproduced signal distorted irregularly posing a problem in applying a magneto-resistance effect film to a reproduction magnetic head is caused by a ferromagnetic domain wall formed in the magneto-resistance effect film.

Further, JP-B-4-8848 discloses means for forming a single magnetic domain by applying a longitudinally biassing magnetic field to a magneto-resistance effect film.

SUMMARY OF THE INVENTION

In the conventional methods described above, the Barkhausen noise caused in reproducing a magnetic signal may be effectively reduced by use of a magneto-resistance effect film.

No consideration is given, however, to the improvement of reproduction sensitivity while reducing the Barkhausen noise. Further, there is no mention of the technical problem concerning a magnetic head mountable on the magnetic disc apparatus improved in recording density.

Accordingly, the object of the present invention is to clarify the technical problem of a magnetic head mountable on a magnetic disc apparatus with an improved recording density and to provide a magnetic disc apparatus suitable for high recording density.

According to one aspect of the present invention, there is provided a magnetic disc apparatus comprising a magnetic head of magneto-resistance effect type including a magneto-resistance effect film for converting a magnetic signal into an electrical signal by use of the magneto-resistance effect, a pair of electrodes for supplying a signal detection current to the magneto-resistance effect film, a magnetic domain control layer for controlling the magnetic domain of the magneto-resistance effect film, and a film for isolating the magnetic coupling between the magneto-resistance effect film and the magnetic domain control layer in a magneto-sensitive portion of the magneto-resistance effect film between the magneto-resistance effect film and the magnetic domain control layer.

According to another aspect of the present invention, there is provided a magnetic disc apparatus comprising a magnetic head of magneto-resistance effect type including a magneto-resistance effect film for sensing the external magnetization and changing the direction of magnetization, a pair of electrodes for supplying a current to the magneto-resistance effect film, a magnetic domain control layer for controlling the magnetic domain of the magneto-resistance effect film, and a non-magnetic film narrower than the length of the magneto-resistance effect film and wider than the interval of the electrodes between the magneto-resistance effect film and the magnetic domain control layer, wherein the width of the reproduction track is substantially determined by the interval of the electrodes formed on the non-magnetic film through the magneto-resistance effect film.

According to still another aspect of the present invention, there is provided a magnetic disc apparatus comprising a reproduction head including a magneto-resistance effect film for converting a magnetic signal into an electrical signal by use of the magneto-resistance effect, a pair of electrodes for supplying a signal detection current to the magneto-resistance effect film and a magnetic domain control layer for controlling the magnetic domain of the magneto-resistance effect film, and a thin-film magnetic head of recording-reproduction separation type (dual head) basically including a first magnetic pole, a second magnetic pole in contact with one end of the first magnetic pole and forming a gap with the other end thereof, a coil wound between the two magnetic poles and a recording head for converting the current flowing in the coil into magnetization, and a film for isolating the magnetic coupling between the magneto-resistance effect film and the magnetic domain control layer, wherein the isolation film (spacer) is longer than 1 μm and smaller than the track width of the recording head.

According to a further aspect of the present invention, there is provided a magnetic disc apparatus comprising a magnetic head of magneto-resistance effect type including a magneto-resistance effect film for converting a magnetic signal into an electrical signal by use of the magneto-resistance effect, a pair of electrodes for supplying a signal detection current to the magneto-resistance effect film, and a magnetic domain control layer for controlling the magnetic domain of the magneto-resistance effect film, wherein an alteration layer with the magnetic domain control layer paramagnetized is formed in a part of the interface of the magnetic domain control layer in contact with the magneto-resistance effect film.

According to a still further aspect of the present invention, there is provided a magnetic disc apparatus comprising a head of magneto-resistance effect type for reproducing a signal with a reproduction track of 0.5 to 2.0 μm.

According to another aspect of the present invention, there is provided a magnetic disc apparatus comprising a magnetic head of magneto-resistance effect type including a magneto-resistance effect film for sensing the external magnetization and changing the direction of magnetization, wherein the magneto-resistance effect film has means for controlling the magnetic domain, and the track width for reproduction is determined within an area where the magnetic permeability of the magneto-resistance effect film is larger than in a portion subjected to magnetic domain control.

According to still another aspect of the present invention, there is provided a magnetic disc apparatus comprising a magnetic disc having recorded therein a magnetic signal with a track of 6.0 to 3.5 μm and a magnetic disc for reproducing a magnetic signal with a track of 3.0 to 0.5 μm, wherein the reproduction track is smaller than the recording track.

According to a further aspect of the present invention, there is provided a magnetic disc apparatus comprising a pair of electrodes and a head for reproducing a magnetic signal recorded in the magnetic disc, wherein the reproduction track width is determined between the electrodes and the reproduction sensitivity is substantially uniform between the electrodes.

A layer formed for the special purpose of applying a vertically biassing magnetic field along the length of a magneto-resistance effect film in order to suppress the generation of a ferromagnetic domain wall in the magneto-resistance effect film is defined as a magnetic domain control layer. The "magnetic exchange coupling", on the other hand, is defined as the coincidence of direction between the spin of an antiferromagnetic film and that of a ferromagnetic film at and in the vicinity of the interface of the two films. The resulting magnitude of the vertically biassing magnetic field applied to the ferromagnetic film is called the "coupling magnetic field". An antiferromagnetic film is paramagnetized at more than a certain high temperature. Beyond this temperature, the magnetic coupling between the antiferromagnetic film and the ferromagnetic film ceases. This temperature is called the "blocking temperature".

In a magnetic head of magneto-resistance effect type according to the present invention, a non-magnetic film is interposed at least in a magneto-sensitive portion as a film separating a magneto-resistance effect film and a magnetic domain control layer. This non-magnetic film functions to block the formation of a direct magnetic exchange coupling between the magneto-resistance effect film and the magnetic domain control layer at the magneto-sensitive portion. As a consequence, there is no anisotropic magnetic film of the magneto-resistance effect film increasing at the magneto-sensitive portion thereof, and therefore the magnetic response characteristic of the magneto-resistance effect element is not deteriorated.

The magnetic domain control layer, on the other hand, acts to apply a vertically biassing magnetic field to the magneto-resistance effect film in an area where the magneto-resistance effect film is in direct contact with the magnetic domain control layer. Upon application of a vertically biassing magnetic field at the particular area, an appropriate vertically biassing magnetic field is applied also to the magneto-sensitive portion of the magneto-resistance effect film, thereby preventing a ferromagnetic domain wall from being formed in the magneto-sensitive portion of the magneto-resistance effect film. In this way, the Barkhausen noise which otherwise might be caused by irregular movement of the ferromagnetic domain wall is effectively suppressed.

Further, a magnetic head of magneto-resistance effect type according to the present invention has a ferromagnetic spacer layer interposed between the antiferromagnetic oxide film and the non-magnetic film. The ferromagnetic spacer film has a function as a protective film for the antiferromagnetic oxide film in forming a non-magnetic film in the magneto-sensitive portion. More specifically, the ferromagnetic spacer layer functions to prevent the damaging of the antiferromagnetic spin orientation of the antiferromagnetic oxide film and stably secures the exchange coupling between the magneto-resistance effect film and the antiferromagnetic oxide film. As a result, the ferromagnetic spacer layer thus interposed prevents performance variations between different wafers or different magnetic heads of magneto-resistance effect type in a wafer, and thus permits stable fabrication of the magnetic head of magneto-resistance effect type.

An antiferromagnetic oxide film is preferable as a material for controlling the magnetic domain of a magnetic head of magneto-resistance effect type according to the present invention. An antiferromagnetic oxide film is capable of forming a magnetic exchange coupling with a magneto-resistance effect film even under a condition exposed to atmosphere. It is thus possible to eliminate the conventional fabrication restraint that the interface between a magnetic domain layer and a magneto-resistance effect film is required to be surface-cleaned before magnetic exchange coupling thereof. Further, the elimination of surface cleaning makes it possible to suppress to a minimum the performance variations of the magnetic domain control layers of a plurality of magnetic heads which are caused as a result of surface cleaning.

Furthermore, in a magnetic head of magneto-resistance effect type according to the present invention, a thin non-magnetic film is formed at a predetermined position on an antiferromagnetic oxide film and a magneto-resistance effect film at a predetermined position on the non-magnetic film and at the position of the magnetic domain control layer not formed with any non-magnetic film. As will be seen, the present invention does not include the process for patterning a magnetic domain control layer at the ends of a magneto-resistance effect film unlike in the prior art, and has the advantage that a magnetic domain control layer is formed in high stability in view of the fact that the magneto-resistance effect film has no thick magnetic domain control layer and is formed in an area with a small misalignment.

An antiferromagnetic oxide film as applied to a magnetic domain control layer conventionally required a considerable thickness if it is to function as a magnetic domain control layer. Also, a magneto-resistance effect film is usually very thin and less than several hundred Å. When an antiferromagnetic oxide film is arranged at the lower ends of a magneto-resistance effect film, therefore, the magneto-resistance effect film formed above them develops a misalignment at an extreme end of the antiferromagnetic oxide film, where the magneto-resistance effect film discontinues. With this discontinuation, a sufficient single magnetic domain condition cannot be maintained within the magneto-resistance effect film, thus making it impossible to prevent the Barkhausen noise. The thickness of the non-magnetic film according to the present invention, on the other hand, need not be more than enough to block the magnetic exchange coupling between the antiferromagnetic oxide film and the magneto-resistance effect film. The magnetic exchange coupling is a phenomenon occurring at or in the vicinity of the interface between a ferromagnetic film and an antiferromagnetic oxide film. In order to block this direct magnetic exchange coupling, therefore, the thickness of at most several ten Å was required of the non-magnetic film. When a very thin non-magnetic film is arranged at a predetermined position on an antiferromagnetic oxide film, with a magneto-resistance effect film formed covering both the non-magnetic film and a predetermined position of the antiferromagnetic oxide film not formed with the non-magnetic film, then a magnetic head of magneto-resistance effect type is produced with a magnetic domain control layer having a minimum misalignment. In this magnetic domain control layer, the misalignment represents a portion where the magneto-resistance effect film rides over the non-magnetic film. This misalignment is minimized according to the present invention in which the non-magnetic film is very thin. As a result, the vertically biassing magnetic field applied to the antiferromagnetic oxide film at the ends of the magneto-resistance effect film where the magneto-resistance effect film is in direct contact with the antiferromagnetic oxide film is capable of being exerted positively and stably on a magneto-sensitive portion without being adversely affected by the misalignment, thus making it possible to suppress the Barkhausen noise. Further, performance variations between a plurality of magnetic heads of magneto-resistance effect type are suppressed.

An alternative method of eliminating the magnetic coupling by paramagnetizing a magnetic domain control layer instead of forming an isolation film (spacer) consists in eliminating the antiferromagnetism by implanting N-ions by ion accelerator into an NiO antiferromagnetic film, for example, in a magnetic domain control layer. In this case, a paramagnetic alteration layer acts as an isolation film. This method has the advantage that the total absence of misalignment in the MR film substantially eliminates the Barkhausen noise.

BRIEF DESCRIPTION OF THE DRAWINGS

FIG. 2 is a schematic diagram showing a configuration of a magnetic disc apparatus and an information processing system according to the present invention.

FIGS. 3A, 3B and 3C are diagrams showing the functions and the magnetic properties of a magnetic domain control layer according to the present invention.

FIG. 10 is a sectional view showing an example of the air-bearing surface of a head of magneto-resistance effect type with an isolation film.

FIG. 11 is a sectional view showing another example of the air-bearing surface of an isolation film head of magneto-resistance effect type.

DESCRIPTION OF THE PREFERRED EMBODIMENTS

Figure 1A:
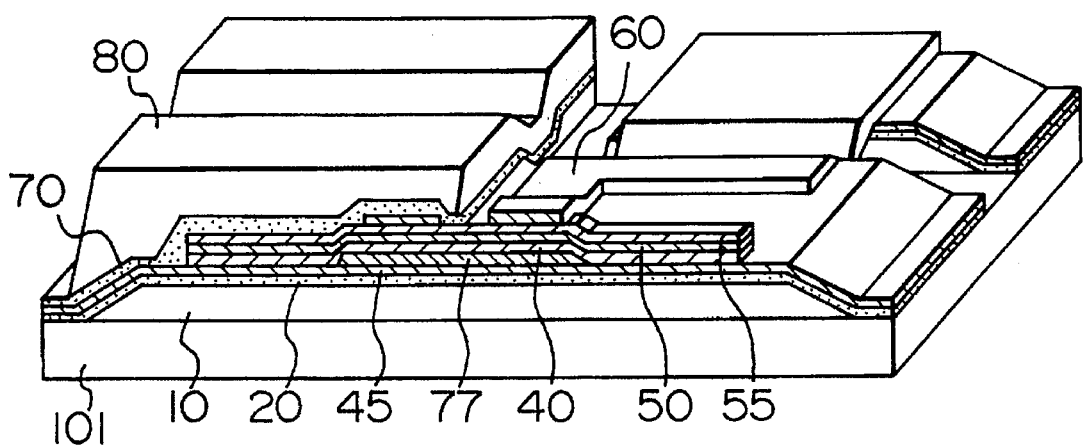
FIGS. 1A and 1B are a perspective view and a sectional view, respectively, showing a magnetic head of magneto-resistance effect type according to an embodiment of the present invention.

A magnetic disc apparatus 200 with a magnetic head of magneto-resistance effect type according to an embodiment of the present invention will be explained with reference to FIG. 2, which is a perspective view showing a schematic configuration of the magnetic disc apparatus 200.

The configuration of this magnetic disc apparatus 200 will be briefly described. As shown in FIG. 2, the magnetic disc apparatus 200 comprises a plurality of magnetic discs 204a, 204b, 204c, 204d, 204e equidistantly layered on a single axis (spindle 202), a motor 203 for driving the spindle 202, a magnet 208 and a voice coil 207 making up a voice coil motor 213 for driving a movable carriage 206 constituting a linear actuator, and a base 201 for supporting them. The magnetic disc apparatus also includes a voice coil motor control circuit 209 for controlling the voice coil motor 213 in accordance with a signal transmitted from a host unit 212 like a magnetic disc control unit. The magnetic disc apparatus further includes a write/read circuit 210 having the functions of converting the data sent from the host unit 212 into a current to be supplied to a magnetic head in accordance with the data write system and amplifying the data sent from the magnetic disc 204a, etc., and converting it into a digital signal. The write/read circuit 210 is connected to the host unit 212 through an interface 211.

Now, the operation of the magnetic disc apparatus 200 in read mode will be explained. The voice coil motor 213 drives the carriage 206 by the control current supplied from the voice coil motor control circuit 209 through the host unit 212 and the interface 211, and the magnetic heads 205a, 205b, etc., are moved and set rapidly to the track position stored with a designated data. This positioning operation is effected by the positioning information of the magnetic disc 204c detected and supplied by the positioning magnetic head 205b connected with the voice coil motor control circuit 209 and by positioning control of the data magnetic head 205a. The motor 203 designated by the base 201 rotates the magnetic discs 204a, 204b, 204c, 204d, 204e of 3.5 inches in diameter mounted on the spindle 202. In the next step, a designated magnetic head is selected in accordance with a signal from the write/read circuit 210, and after detection of head position of the designated area, the data signal on the magnetic disc is read out. This reading operation is effected by the data magnetic head 205a connected to the write/read circuit 210 exchanging a signal with the magnetic disc 204d. The data thus read out is converted into a predetermined signal and sent to the host unit 212.

A preferable high-performance magnetic disc apparatus has a surface recording density of 50 megabits or more per square inch on the magnetic disc, a line recording density of 25 kilobits or more per inch, and a track density of 2000 tracks or more per inch. A magnetic head of magneto-resistance effect type according to the present invention described below has a high sensitivity without the Barkhause noise for lack of the ferromagnetic domain wall, and therefore may be used to fabricate a magnetic disc apparatus with a recording density of 200 to 600 megabits per square inch.

The disadvantage mentioned below was encountered in realizing a magnetic disc apparatus with a conventional head.

In the case of U.S. Pat. No. 4,103,315 for forming an antiferromagnetic film in direct contact with the whole surface on one side of a magneto-resistance effect film, a strong vertically biassing magnetic field is applied to the magneto-resistance effect film. As a consequence, although the Barkhausen noise is completely suppressed, an excessively large coupling magnetic field makes it difficult to rotate the magnetic moment in the magneto-resistance effect film, thereby posing the problem of a deteriorated magnetic response characteristic of the magnetic head of magneto-resistance effect type.

According to U.S. Pat. No. 4,663,685 in which an antiferromagnetic film such as of Fe—Mn alloy functioning as a magnetic domain control layer is formed at the upper ends of a magneto-resistance effect film, on the other hand, an antiferromagnetic film is required to be formed as a magnetic domain control layer on the magneto-resistance effect film after patterning of the magneto-resistance effect film to predetermined size. Also, it is necessary to generate a magnetic exchange coupling between a ferromagnetic film providing a magneto-resistance effect film and an antiferromagnetic film. This magnetic exchange coupling force has so short a working range that the two films are required to be formed closely in atomic terms in order to generate the magnetic exchange coupling. Consequently, it is necessary in the process of patterning a magneto-resistance effect film to clean by some method the surface of the magneto-resistance effect film fouled by oxide or the like, and form an antiferromagnetic film on the magneto-resistance effect film thus cleaned. Not only the cleaning of the surface of a magneto-resistance effect film involves a complicated process, but also the magneto-resistance effect film is generally very thin at several hundred or less. The magneto-resistance effect film is thus very liable to be damaged by the cleaning. As a result, the magnetic characteristics of the magneto-resistance effect film are adversely affected. If the surface cleaning is not substantially uniform and is subjected to fluctuations, the thickness of the magneto-resistance effect film also undergoes a change, with the result that the magnetic characteristics vary from one magnetic head to another. Further, insufficient surface cleaning would cause an insufficient strength of magnetic exchange coupling between a magneto-resistance effect film and an antiferromagnetic film, often resulting in the ends of the magneto-resistance effect film not being in the state of a single magnetic domain. In the case where the ends are not in the state of a single magnetic domain, the Barkhausen noise is generated by irregular movement of a ferromagnetic domain wall which is present in the magneto-resistance effect film. Such a magnetic head is not suitably used with a high-density magnetic recording apparatus.

Figure 1B:
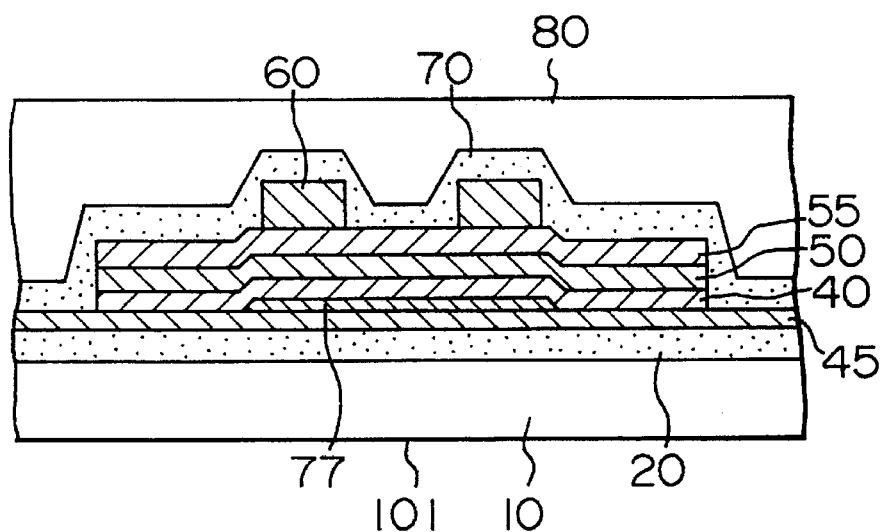

FIGS. 1A and 1B show a magnetic head of typical magneto-resistance effect type 1000 according to the present invention, as an embodiment most suitable for obviating the above-mentioned problems. FIG. 1A is a perspective view, and FIG. 1B shows an enlarged section as viewed from the surface opposite to a medium, i.e., a magnetic recording medium.

The head of magneto-resistance effect type 1000 shown in FIGS. 1A and 1B comprises a lower shield film 10 on a ceramics substrate 101 of such a material as zirconia, a lower gap film 20 formed on the lower shield film 10, a magnetic domain control layer 45 formed on the upper side of the lower gap film 20, an isolation film 77 arranged at least in the magneto-sensitive portion of the magneto-resistance effect film 40 on the magnetic domain control layer 45, the magneto-resistance effect film 40 formed covering a predetermined area of the magnetic domain control layer 45 lacking the arrangement of the isolation film 77 over the isolation film 77, a soft film 55 and a shunted film 50 arranged on the magneto-resistance effect film 40, a signal detection electrode 60 formed on the soft film 55, an upper gap film 70 formed covering each of the above-mentioned films, and an upper shield film 80 formed on the upper side of the upper gap film 70. The present invention relates to a configuration of an electrode film, a magneto-resistance effect film and a magnetic domain control layer functioning to prevent the noise called the Barkhausen noise.

Now, explanation will be made about the respective films and the functions and materials thereof.

The upper shield film 80 and the lower shield film 10 have the functions of preventing the magnetic fields other than signals from having an effect on the magneto-resistance effect film 40 and improving the signal resolution of the head of magneto-resistance effect type 1000. These films are made of a soft magnetic material such as Ni—Fe or Ni—Co alloy or amorphous alloy of Co group, and have the thickness of about 0.5 to 3 μm.

The upper gap film 70 and the lower gap film 20, which are arranged adjacently to the magnetic shield films 80, 10, have the functions to isolate the magneto-resistance effect elements from the upper and lower shield films 80 and 10 both electrically and magnetically, and are made of a non-magnetic insulating material such as glass or alumina. The thickness of the upper gap film 70 and the lower gap film 20, which affects the reproduction resolution of the head of magneto-resistance effect type 1000, is dependent on the desired recording density of the magnetic disc apparatus and is generally in the range of 0.4 to 0.1 μm. The interval between the two signal detection electrodes 60 ranges from 0.5 to 10 μm. The interval between the signal detection electrodes 60 of the magneto-resistance effect film 40 is called the magneto-sensitive portion which reads the signal from the magnetic disc. In order to make a linear electrical signal of the magnetic signal from the magnetic disc, a shunted film 50 and a soft film 55 are arranged for applying a laterally biassing magnetic field to the magneto-resistance effect film 40. The magneto-resistance effect film 40 is formed of a ferromagnetic film with an electrical resistance changing with the direction of magnetization such as Ni—Fe alloy, Ni—Co alloy or Ni—Fe—Co alloy, and has a thickness of about 0.01 m to 0.045 μm. A ferromagnetic domain wall is generated at the portion, with the isolation film removed therefrom, where the magnetic domain control layer 45 and the magneto-resistance effect film 50 are in direct contact with each other, and it is known that this portion fails to function as a magnetic domain control film if not extending more than 3 microns along the length of the magneto-resistance effect film.

A thin film of such a material as Cu, Au, Nb or Ta of low electrical resistance is generally used for the signal detection electrode 60 in order to supply a sufficient current of, say, $1 \times 10^6$ to $2 \times 10^7 A/cm^2$ to the magneto-resistance effect film 40.

The shunted film 50 functions to apply a laterally biassing magnetic field to such a sufficient level as to make the magneto-resistance effect film 40 high in sensitivity. The direction of this bias application is perpendicular to the direction of application by a magnetic domain control layer mentioned above. A method using a shunted film for applying a laterally biassing magnetic field is called the shunt-bias method. In the shunt-bias method, a thin metal film of Ti, Nb, Ta, Mo or W is formed as a shunted film on the magneto-resistance effect film 40. This film normally has a thickness of 0.01 to 0.04 µm. In view of the fact that the laterally biassing magnetic field changes with the current flowing in the shunted film, it is necessary to adjust the specific resistance as well as the thickness of the shunted film 50. As a rule, the value of this specific resistance is approximately one to four times that of the magneto-resistance effect film 40.

A method other than the shunt-bias method for applying a laterally biassing magnetic field up to a level sufficient to make a highly sensitive magneto-resistance effect film 40 suitable to a head of magneto-resistance effect type for high-density magnetic recording is the soft film bias method.

According to the soft film bias method, a ferromagnetic film having a soft magnetic characteristic is formed adjacently to a magneto-resistance effect film through a non-magnetic layer, and the magnetic field generated by the current flowing in the magneto-resistance effect film is efficiently applied to the magneto-resistance effect film. Such a material as Ni—Fe—Ru, Ni—Fe—Ta, Ni—Fe—Rh, Co—Zr—Cr or Mn—Zn ferrite is used as a soft film 55.

Although these methods may be used independently, the composite bias method in which a soft film 55 is formed on a shunted film 50 (non-magnetic film) as shown in FIG. 1 is effective and is used for the head of magneto-resistance effect type 1000 according to the present invention.

Now, explanation will be made about a method for fabricating the head of magneto-resistance effect type 1000. The sputtering, etching and photolithography are used for patterning and forming a thin film.

First, Ni—Fe alloy for making a lower shield film 10 is formed by the thickness of 2 m, followed by forming a 0.3-µm-thick alumina for making a lower gap film 20 thereon. The lower shield film 10 and the lower gap film 20 are processed to a predetermined shape. In the process, the ends of the lower shield film 10 are processed to incline against the substrate surface as shown in FIG. 1. This is to prevent the signal detection electrode 60 formed covering the lower magnetic shield film 10 from disconnecting at an end of the lower shield film 10. In the next step, a magnetic domain control layer 45 0.04 to 0.2 µm thick is formed above the lower gap film 20. An isolation film 77 is formed by the thickness of about 0.01 to 0.2 µm at a predetermined position. The lift-off method or the like is used to arrange the isolation film 77 at least in the position of the magneto-sensitive portion of the magneto-resistance effect film 40. In forming this isolation film 77, the ends thereof should better be tapered in order to prevent the discontinuance of the magneto-resistance effect film 40. The isolation film 77 may alternatively be formed by the ion-milling method or the like. Next, an Ni—Fe alloy film 40 is formed by the thickness of 400 Å as the magneto-resistance effect film 40 over the isolation film 77, followed by forming an Nb film 400 Å thick as a shunted film 50. Then, a 400-Å-thick Co—Zr—Nb film providing a soft film 55 is formed. After that, the soft film 55, the shunted film 50, the magneto-resistance effect film 40 and the isolation film 77 are collectively processed into the shape shown in FIG. 1. Then, a double-layer film of gold and titanium to make up a signal detection electrode 60 is formed by the thickness of 1 µm and is appropriately processed, followed by forming a 0.3-µm-thick alumina as an upper gap film 70 thereon. In the next step, an Ni—Fe alloy film to make up an upper magnetic shield film 80 is formed by the thickness of 2 µm, and alumina is formed as a protective film, thus completing the fabrication of a head of magneto-resistance effect type 1000.

The use of a head constructed according to the present invention makes it possible to provide a magnetic head of magneto-resistance effect type which has a high sensitivity without sacrificing the magnitude of the magnetic exchange coupling and has such a layered configuration as to function as a magnetic domain control layer at the ends of a magneto-resistance effect film without requiring the cleaning thereof which is the cause of characteristics variations and noises. Also, a method of fabricating a magnetic head of magneto-resistance effect type is provided which is capable of suppressing the performance variations between a plurality of magnetic heads of magneto-resistance effect type attributable to the characteristics variations of a magnetic domain control layer.

Materials constituting the magnetic domain control layer 45 and the isolation film 77 will be described.

An oxide film is desirable for the magnetic domain control layer 45 in order to improve the shunt ratio of the detection current supplied to the magneto-resistance effect film. A desirable oxide film having a magnetic domain control effect is ferromagnetic or antiferromagnetic. An antiferromagnetic nickel oxide (NiO) is especially preferable due to the stability against the external magnetic field, the blocking temperature and the ease to fabricate. Hematite ($\alpha$-$Fe_2O_3$) is assumed to be an effective substitute of NiO as a material of the antiferromagnetic oxide film 45. Further, such a magnetic element as Fe, Co or Ni or a rare earth magnetic element like La, Ce, Pr, Nd, Pm, Sm, Gd, Tb, Dy, Ho, Er, Tm or Yb may be added to NiO as a replacement material.

Recommended materials for the isolation film 77 include Al, Ti, Cu, Nb, Mo, Ta, W, Ti, V, Cr, Rh, Ru, Zr, Pd, Ag, Pt, In, Sn, Re, Os, Ir, Au, alumina ($Al_2O_3$), silicon oxide ($SiO_2$), titania ($TiO_2$), hafnia ($HfO_2$), zirconia ($ZrO_2$) or carbon (C). Further, a non-magnetic alloy film of any two or more of the above-mentioned metal elements combined may be used for the same purpose. Another alternative is a material made by adding a third element to any of the oxides or carbon mentioned above. Furthermore, $Al_2O_3$, $SiO_2$, $TiO_2$, $HfO_2$ or $ZrO_2$ which exhibit an insulating characteristic may be used advantageously to increase the current density supplied to the magneto-resistance effect film 40 thereby to improve the sensitivity of a magnetic head of magneto-resistance effect type.

The thickness of the isolation film 77 according to the present invention is in the range of 10 to 300 Å. As shown in FIG. 1, the magneto-resistance effect film 40 is formed above the isolation film 77. The magneto-resistance effect film 40, which is formed riding over the isolation film 77, develops a discontinuance, if the thickness of the isolation film 77 is large. The isolation film, therefore, should be as thin as possible or is required to be less than 200 Å. The critical radius for making a continuous isolation film by the film-forming technique like sputtering is 100 Å or more. As a result, the thickness of the isolation film 77 is preferably in the range of 100 to 200 Å. Further, in order to transmit a biassing magnetic field effectively from an end, the thickness of the magneto-resistance effect film 40 should be larger than that of the isolation film.

A magnetic domain control layer according to the present invention, which is configured of a shield film to constitute an MR head, is applicable to the non-shield magnetic head of magneto-resistance effect type, the yoke magnetic head of magneto-resistance effect type, the magnetic-tape magnetic head of magneto-resistance effect type and further to the magnetic sensor utilizing the magneto-resistance effect of a simple ferromagnetic film.

FIG. 3A is an enlarged sectional view of the magneto-resistance effect film 40, the isolation film 77 and the magnetic domain control layer 45 as viewed from the side of a medium opposed thereto and is a diagram showing the effect of the magnetic domain control layer, for explaining a model of the magnetic domain control layer 100 included in an MR head 1000. In FIG. 3A, the directions of magnetic moments in the magneto-resistance effect film 40 and in the magnetic domain control layer 45 are indicated by arrows 401 and 451, respectively, to explain in detail the process of applying a vertically biassing magnetic field to the magneto-sensitive portion of the magneto-resistance effect film 40. Nickel oxide (NiO) is selected as a material of the magnetic domain control layer 45, and a typical Ni—Fe alloy as a material of the magneto-resistance effect film 40. FIGS. 3B and 3C show magnetization curves of a magnetic exchange coupling of an NiO film and an Ni—Fe alloy film. The NiO film has a thickness of 1000 Å, and the Ni—Fe alloy film 400 Å. The easy axis drive is shown in FIG. 3B, and the hard axis drive in FIG. 3C.

The antiferromagnetic oxide film providing a magnetic domain control layer 45 shown in FIG. 3A is in direct contact with the magneto-resistance effect film 40 at the ends thereof. As a result, the magneto-resistance effect film 40 and the magnetic domain control layer 45 constitute a ferromagnetic-antiferromagnetic exchange coupling at this area. Once a magnetic exchange coupling is formed, the magnetization curve shifts in one direction as shown in FIG. 3B. The amount of shift of the origin of the magnetization curve represents the magnitude of the coupling magnetic field, i.e., the magnitude of the vertically biassing magnetic field. In FIG. 3B, the magnitude of the coupling magnetic field is about 20 Oe. In the case where this magnetic exchange coupling is formed in the process of heating to higher than the blocking temperature of the magnetic domain control layer 45 and cooling to lower than the blocking temperature while applying an external magnetic field in one direction, for example, the magnetic moment in the magnetic domain control layer 45 is fixed in the direction of arrow 451, while the magnetic moment in the magneto-resistance effect film 40 is directed along the arrow 401. The magnetic anisotropy of an antiferromagnetic material is generally very strong, and therefore, once the direction of the magnetic moment in an antiferromagnetic film is fixed, the magnetization in the antiferromagnetic film remains unchanged depending on the external magnetic field of several ten kOe. The magnetic moment in the magneto-resistance effect film 40 forming a magnetic exchange coupling with the magnetic domain control layer 45 is fixed firmly in the direction shown by arrow 401. If the magnetic moment is directed along the arrow 401 at the ends of the magneto-resistance effect film 40, the magnetic moment of the magneto-sensitive portion of the magneto-resistance effect film 40 not in direct contact with the magnetic domain control layer 45 is also forcibly directed along the arrow 402. In this way, the magneto-sensitive portion of the magneto-resistance effect film 40 is also capable of being maintained in the state of a single magnetic domain.

With the formation of a magnetic exchange coupling, on the other hand, the anisotropic magnetic field increases by an amount equivalent to the coupling magnetic field. The anisotropic magnetic field is defined as a magnetic field required for saturating the magnetization curve in FIG. 3C and indicates the degree of ease of rotation of magnetic moment. The diagram shows that the magnitude of the anisotropic magnetic field is about 25 Oe. The magnitude of this magnetic anisotropy is excessive from the viewpoint of the reproduction sensitivity. According to the present invention, the isolation film 77 is arranged intermediate the magneto-resistance effect film 40 and the magnetic domain control layer 45 at least in the magneto-sensitive portion of the magnetic resistance effect film 40. In the area where the isolation film 77 is interposed, the direct magnetic exchange coupling between the magneto-resistance effect film 40 and the magnetic domain control layer 45 can be prevented from forming. For this reason, the rotation of magnetic moment in the magneto-resistance effect film 40 at the magneto-sensitive portion becomes comparatively free, thereby producing a magnetic head of magneto-resistance effect type improved in the magnetic response characteristic. In addition, a vertically biassing magnetic field suitable is applied for maintaining the magneto-sensitive portion of the magneto-resistance effect film 40 in the state of a single magnetic domain by the magnetic domain control layer 45 at the ends of the magneto-resistance effect film 40, and therefore the Barkhausen noise is suppressed.

Figure 4A:
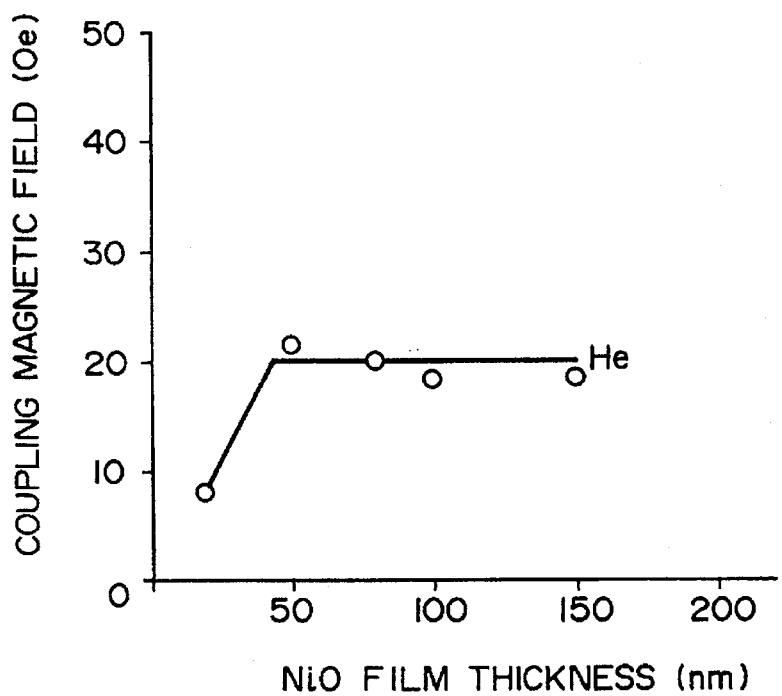
FIGS. 4A and 4B are diagrams showing the dependency of the coupling magnetic field of an NiO film and the blocking temperature of a magnetic domain control layer on the thickness of an NiO film.
Figure 4B:
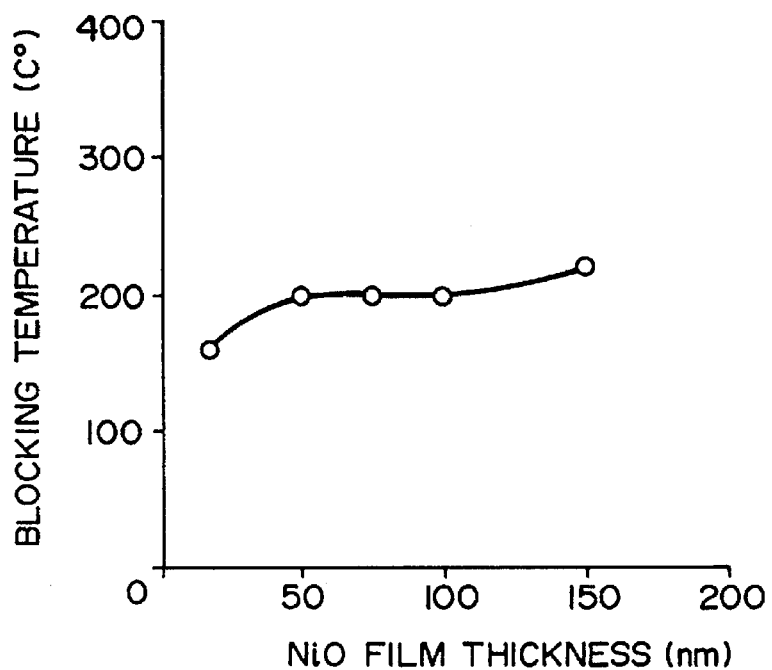

FIGS. 4A and 4B show the magnitude and the blocking temperature of the coupling magnetic field and the Ni—Fe alloy film with the thickness of the NiO changed. It is seen that the coupling magnetic field is constant at the NiO thickness of more than 500 Å and is deteriorated at lower thicknesses. The blocking temperature, on the other hand, is about 200° C. at the NiO film thickness of more than 500 Å and is deteriorated at lower than the same thickness. The magnetic characteristic is deteriorated when the NiO film is thin, probably because the crystalline structure of the NiO film is not complete and the antiferromagnetic structure of the NiO film is partially incomplete. As a result, it is apparant that the thickness of the NiO film is required to be at least 500 Å, if a magnetic exchange coupling is to be formed stably between the Ni—Fe alloy film and the NiO film.

As explained above, the NiO film is required to be at least 500 Å or thicker if it is to function as a magnetic domain control layer. The mere arrangement of an NiO film at the lower ends of the magneto-resistance effect film 40 causes a discontinuance of the magneto-resistance effect film 40 formed above the boundary between the area having the NiO film and the area not having any NiO film. The discontinuance of a magneto-resistance effect film makes it impossible for the vertically biassing magnetic field applied to the magneto-resistance effect film 40 at the ends to reach the magneto-sensitive portion, with the result that the vertically biassing magnetic field terminates at the point of discontinuance. According to the present invention, however, as shown in FIG. 2, an antiferromagnetic oxide film is arranged also on the lower side of the magneto-sensitive portion of the magneto-resistance effect film 40, with the isolation film 77 formed thereabove, thereby attaining the same function as a magnetic head of magneto-resistance effect type with a magnetic domain control layer arranged at the ends of the magneto-resistance effect film 40. The nickel oxide (NiO) forms a part of the gap, and therefore is preferably as thin as less than 200 nanometers. The apparatus according to the present invention is configured of a very thin isolation film 77. The magnetic exchange coupling is a physical phenomenon occurring at or in the vicinity of the interface between a ferromagnetic film and an antiferromagnetic film. In view of this, in order to prevent the formation of a magnetic exchange coupling at the magneto-sensitive portion, at least a layer of isolation film should be interposed between the ferromagnetic film and the antiferromagnetic film. To the extent that the isolation film is continuous, the direct magnetic exchange coupling is capable of being prevented even when the thickness thereof is equivalent to one atomic layer. According to the present invention, the isolation film 77 is formed by sputtering. Experiments conducted by the inventors show the thickness of about 100 Å is sufficient to make a completely continuous isolation film 77. In this way, according to the present invention, in the case where the isolation film 77 is interposed at least in the magneto-sensitive portion of the magneto-resistance effect film 40 on the antiferromagnetic oxide film 45, and the magneto-resistance effect film 40 is formed over them, then the isolation film 77 is so thin that the magneto-resistance effect film 40 is not discontinued. As a result, it is possible to apply a stable vertically biassing magnetic field of appropriate magnitude with an improved magnetic response characteristics to the magneto-sensitive portion of the magneto-resistance effect film 40, thus suppressing the characteristics variations between a plurality of magnetic heads of magneto-resistance effect type.

The isolation film 77 is not necessarily continuous. A somewhat porous discontinuous film permits reduction of an excessively large vertically biassing magnetic field between the magnetic domain control layer 45 and the magneto-resistance effect film 40 at the magneto-sensitive portion. Further, the same object is achieved sufficiently by the interposition of a film of low saturation magnetic flux density.

The isolation film 77 may be constituted of either a single metal film, an alloy film or an oxide film, crystalline or amorphous, although the most preferable material is an oxide like alumina having a great affinity with oxygen.

As shown in the magnetic head of magneto-resistance effect type 1000, a shunted film 50 and a soft film 55 are formed for applying a laterally biassing magnetic field to the magneto-resistance effect film 40 to improve the magnetic response characteristic above the magneto-resistance effect film 40, with a signal detection electrode 60 formed thereabove. The shunted film 50 is a conductive film. When a current flows in the shunted film 50, a magnetic field is generated around the shunted film 50 in the direction determined according to the corkscrew rule, with the result that the magnetic moment in the magneto-resistance effect film 40 rotates. Thus a laterally biassing magnetic field is applied to the magneto-resistance effect film 40. Also, the soft film 55 has a soft magnetic characteristic. When a current flows in the magneto-resistance effect film 40, a magnetic field is generated in the direction determined by the corkscrew rule around the magneto-resistance effect film 40. With the rotation of the magnetic moment in the soft film 55, therefore, the magneto moment in the magneto-resistance effect film 40 is rotated in such a manner as to stabilize the static magnetic energy. As a result, a laterally biassing magnetic field is applied to the magneto-resistance effect film 40. Either the shunted film 50 or the soft film 55 may be used for applying a laterally biassing magnetic field. Nevertheless, both the shunted film 50 and the soft film 55 may be used at the same time with the above-mentioned configuration due to the same direction of rotation of magnetic moment.

According to the present invention, the isolation film 77 is interposed at the lower magneto-sensitive portion of the magneto-resistance effect film 40. When the isolation film 77 is configured of a conductive film, the same effect as the shunted film 50 is exerted on the magneto-resistance effect film 40. In such a case, a laterally biassing magnetic field in the direction opposite to that of the one applied by the shunted film 50 and the soft film 55 is applied to the magneto-resistance effect film 40, thereby deteriorating the magnetic response characteristic of a magnetic head of magneto-resistance effect type. This deterioration may be prevented by reducing the thickness and increasing the specific resistivity of the isolation film. According to the present invention, such a deterioration is prevented by constituting an isolation film of an alloy film, whereby the specific resistivity is increased.

Further, the isolation film 77 performs the important function of preventing oxygen diffusion at the same time. Assuming that the magnetic domain control layer 45 and the magneto-resistance effect film 40 are in direct contact with each other and heat history is received in the process of fabrication, then oxygen is diffused from the magnetic domain control layer 45 to the magneto-resistance effect film 40. If such impurities as oxygen are contained in the magneto-resistance effect film 40, the change rate of magneto-resistance of the magneto-resistance effect film 40 is deteriorated. As a result, it is necessary to block oxygen penetration into the magneto-resistance effect film 40 from the magnetic domain control layer 45 at least in the magneto-sensitive portion. The interposition of the isolation film 77 according to the present invention is considered to block oxygen penetration effectively. Oxygen penetrates the magneto-resistance effect film 40 to some degree at the ends thereof in direct contact with the magnetic domain control layer 45. These oxygen probably will not diffuse into the magneto-sensitive portion of the magneto-resistance effect film 40 at the temperature range of fabrication processes. The oxygen penetration at the ends of the magneto-resistance effect film 40, therefore, is considered not to pose a great problem.

Further, two or more kinds of the above-mentioned metals may be combined to produce an alloy film, in which case the specific resistivity of the isolation film 77 is advantageously improved.

Furthermore, the isolation film 77 may be constructed of an alloy film or a metal film comprising Cu, Rh, Pd, Ag, Ir, Pt or Au having a crystalline structure of F.C.C or one of these elements as a principal component with at least another of the elements added thereto in small amount. In such a case, the magnetic characteristics of the magneto-resistance effect film 40 are improved. The magneto-resistance effect film 40 is generally constructed of an Ni—Fe alloy film, an Ni—Co alloy film or the like, which has a crystalline structure of F.C.C. In the case where the isolation film 77 has a crystalline structure of F.C.C., therefore, the magneto-resistance effect film 40 is obtained by epitaxial growth on the isolation film 77. The successful epitaxial growth of the magneto-resistance effect film 40 could improve the magnetic characteristics of the magneto-resistance effect film 40.

In addition, the isolation film 77 may be constructed of a magnetic element such as Fe, Co or Ni as a principal component and by adding a non-magnetic element thereto until non-magnetism is attained.

The antiferromagnetic oxide film, which has been processed into the same shape as the lower gap film 20 after being appropriately formed in the above-mentioned case, may alternatively be processed into the same shape as the magneto-resistance effect film 40 at the time of processing the magneto-resistance effect film 40.

Also, the antiferromagnetic oxide film may be processed into any shape to the extent that the length and width thereof are larger than those of the magneto-resistance effect film 40.

The magnetic head of magneto-resistance effect type described above has a conventional thin-film magnetic head of electromagnetic induction type functioning as a recording head formed thereabove to constitute a dual head to be used with, for example, an external magnetic memory unit of a mainframe computer. According to the prior art disclosed in U.S. Pat. No. 4,103,315, for example, a magneto-sensitive portion is arranged forming a magnetic exchange coupling directly between a magneto-resistance effect film 40 and a magnetic domain control layer 45. As a result, the reproduction sensitivity is deteriorated in spite of the Barkhausen noise being alleviated, thereby reducing the S/N. According to the present invention, however, the vertically biassing magnetic field applied to the magneto-resistance effect film 40 is minimized to the extent that the Barkhausen noise is reduced. More specifically, the present invention has such a layer configuration as to reduce noises while maximizing signals. In a magnetic head of magneto-resistance effect type according to the present invention, therefore, a large S/N is secured, thereby making it possible to produce a large-capacity magnetic disc apparatus of more than 200 Mb/in$^2$ in surface recording density which cannot be realized according to the prior art.

Further, a magnetic head of magneto-resistance effect type according to the present invention, which is configured of a shield film, is applicable with equal effect to a non-shield magnetic head of magneto-resistance effect type, a yoke magnetic head of magneto-resistance effect type or a magnetic sensor utilizing the magneto-resistance effect of a ferromagnetic film.

Furthermore, the first object of the present invention may be achieved using an Fe—Mn alloy film providing a magnetic domain control layer configured as described above by reducing the humidity in the magnetic disc apparatus or otherwise improving the environmental conditions, instead of using the antiferromagnetic oxide film as the magnetic domain control layer 45 as described above. Also, the same object may be achieved by using a permanent magnet of a Co—Pt alloy film as a material for magnetic domain control.

Figure 5A:
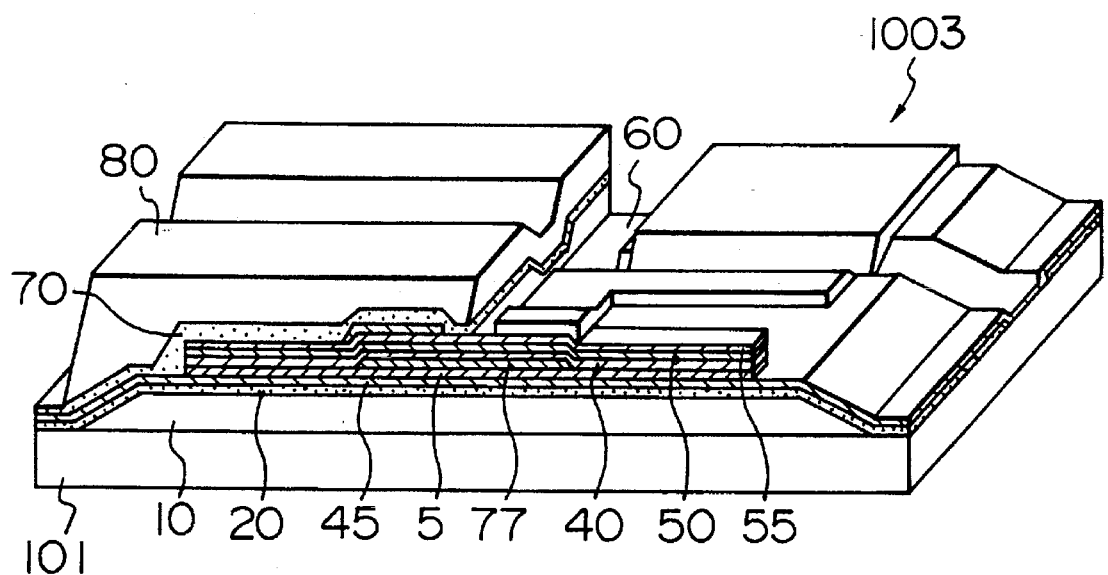
FIGS. 5A and 5B are a perspective view and a sectional view, respectively, showing a head having a ferromagnetic spacer film according to another embodiment of the present invention.
Figure 5B:
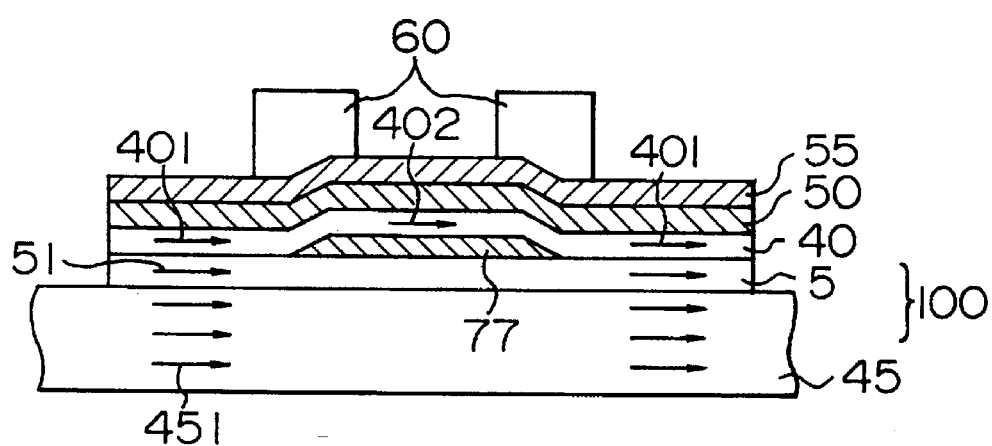

In addition, as shown in the head 1003 shown in FIGS. 5A and 5B, a ferromagnetic or ferrimagnetic film 5 may be interposed between the magnetic domain control film 45 and the isolation film 77. In such a case, the magnetic domain control film 45 is prevented from being damaged by ion milling or the like in the process of forming an intermediate film, leading to the advantage that an MR head is produced stably without adversely affecting the exchange coupling.

Another embodiment of the present invention will be explained below.

Figure 6A:
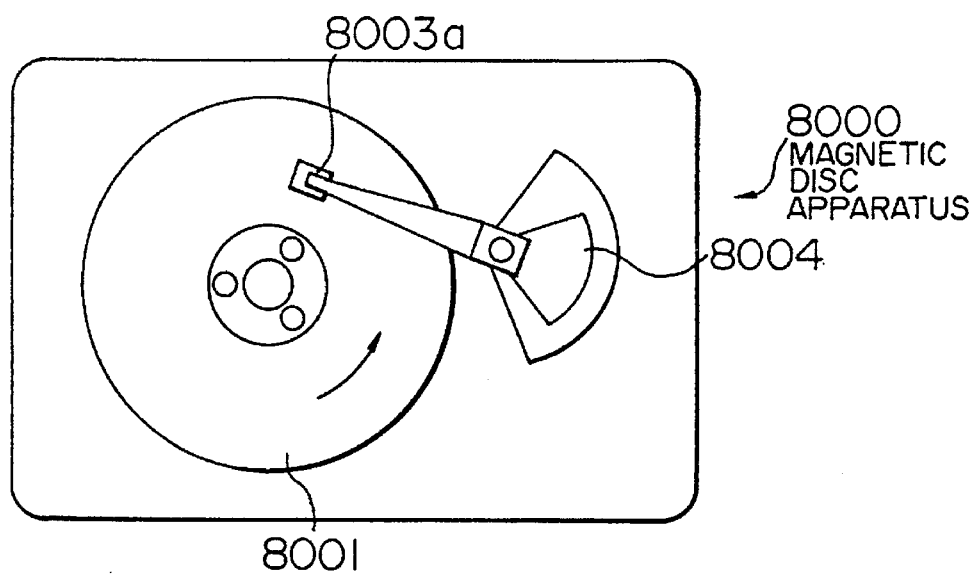
FIGS. 6A and 6B are schematic diagrams showing a small-sized magnetic disc according to an embodiment of the present invention.
Figure 6B:
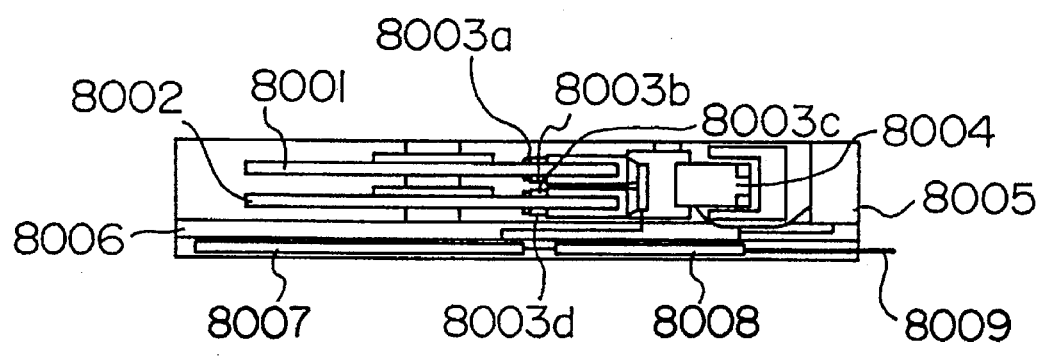

FIGS. 6A and 6B show a magnetic disc apparatus 1000 using an MR composite (dual) head according to an embodiment of the present invention. The housing of the apparatus includes a base board. Two magnetic discs 8001, 8002, four MR dual heads 8003a to 8003d in contact with the two sides of the magnetic discs 800, 8002, a rotary actuator 8004, and drive and control circuits for the rotary actuator 8004, and a motor directly connected to the spindle for driving the disc, are arranged on the front side of the base board. On the other hand, a head drive circuit 8007, a signal processing circuit and an input-output interface 8008 are disposed on the back of the base board. There is also provided a bus line 8009. These component parts are housed integrally and are connected to external circuits by a 32-bit bus line. A disc of 46 millimeters and the data surface of 10 to 40 millimeters are used. An embedded servo system is used without any servo surface, thereby making possible a high density. The apparatus under consideration is connectable directly as an external memory unit of a small-sized computer. A cache memory is mounted in an input-output interface and corresponds to a bus line with a transfer speed in the range of 5 to 20 megabytes per second. Also, A large-capacity magnetic disc apparatus may be constructed of a plurality of apparatuses according to the present invention by connecting an external controller. The track density of a magnetic disc apparatus according to the present invention is 21000 tracks per inch, and the linear recording density is 120000 bits per inch. The operating capacity of the apparatus is 1.2 gigabytes.

Figure 7:
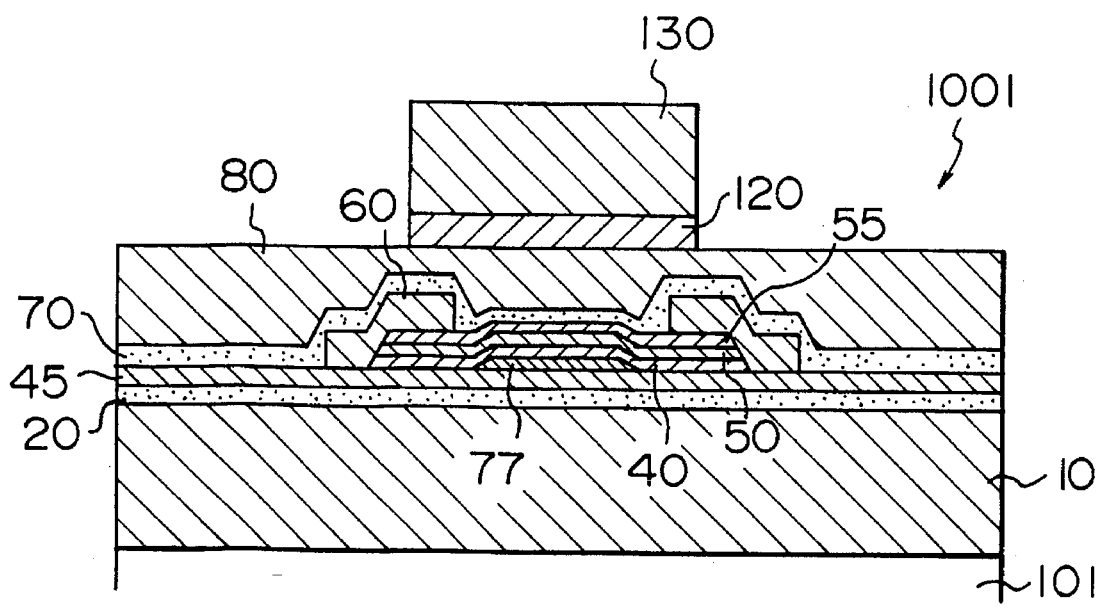
FIG. 7 is a diagram showing an air-bearing surface of a head doubling as an upper shield according to an embodiment of the present invention.

An MR composite head making possible a magnetic disc apparatus according to the present invention is designated by 1001 in FIG. 7. The head according to the present invention includes a magnetic head of induction type for recording and a magnetic head of magneto-resistance type for reproduction. The feature of the head under consideration lies in that an upper shield doubles as a lower magnetic core. This is due to the requirement of reducing the reproduction track width substantially in view of the fact that the head angle (yaw angle) to the track is different between outer and inner peripheries of a small disc. The more the problem of yaw angle is neglibile, the smaller the distance between the recording head and the reproduction head. According to the system under consideration, the problem of yaw angle posed by a dual head is avoided, and a large reproduction track width is secured. Nickel oxide is used for the magnetic domain control film 45, and Al$_2$O$_3$ for the isolation film 77. The nickel oxide (NiO) has a thickness of 50 nanometers, and the isolation film 77 ten nanometers. The isolation film is formed on NiO and then is processed by ion milling to expose the NiO, above which an MR film 40 is formed. According to the present invention, there is no need of coincidence between the end of the isolation film 77 and that of the electrode 60, and therefore the electrode intervals Wcd may be set smaller than the interval Wdc of magnetic domain control films. According to the present embodiment, Wdc is set to 3 micrometers, and Wcd to one micrometer thereby to avoid the restraint on magnetization rotation of the magneto-sensitive portion by a magnetic domain control film. The SAL film 55 is made of an Ni—Fe alloy superior in soft magnetic characteristics. The SAL film, which is not restrained by the magnetic domain control film 45, is oriented for magnetization in the direction opposite to the MR film. In the process, an excessive rotation of magnetization of the magneto-sensitive portion by bias application would cause a diamagnetic field in the MR film other than the magneto-sensitive portion. The SAL film that has been coupled in the opposite direction to the MR film rotates in the direction opposite to the MR film in such a way as to absorb the diamagnetic field of the MR film, and therefore keeps constant the amount of rotation of the MR film effectively in the magneto-sensitive portion. This has the effect of reducing the sensitivity distribution in the magneto-sensitive portion of the MR head and increasing the reproduction sensitivity of the head with a narrow track to a maximum. The shunted film 50 according to the present invention is made of Ta, which is high in resistance and increases the shunt ratio of the MR film, thus improving the sensitivity. The electrode 60, on the other hand, is constructed of a triple layer of Cr/Au/Nb, and shield fields 10, 80 of permalloy. The gap films 20, 70 are made of $Al_2O_3$ (Alumina), and the magnetic core of the recording head 130 of a Co—Ni—Fe film. The Co-Ni—Fe film has a large saturation magnetic flux density and a thickness smaller than the Ni—Fe film for producing a magnetic field required for recording, so that a narrow-track recording head is produced easier. The coil of the recording head is formed by Cu galvanization, with photoresist employed as an interlayer insulating film. The track width of the recording head is 1.2 micrometers, and the thickness of the upper magnetic pole one micrometer.

A method of fabricating an MR dual head according to the present invention will be explained. An $Al_2O_3$ (Alumina) film 101 is formed on a ceramics substrate. A magnetic domain control NiO layer 45 and another $Al_2O_3$ film providing a part of a gap film and a lower shield 10 are formed by sputtering on the $Al_2O_3$ film 101. Further, another $Al_2O_3$ film 77 providing an isolation film is formed, a part of which is removed by ion milling. The portion thus removed makes up a contact with an MR film. An Ni—Fe (MR) film 40, a Ta isolation (shunted) film 50 and a SAL film 55 are formed on the resulting assembly and are patterned into stripes as shown. Even if the NiO (or Ni—O) film and the $Al_2O_3$ gap film are damaged in the process, the magnetic characteristics of the MR and the magnetic domain control capability of the NiO film are not affected. An electrode of Nb, Au and Cr is formed further above and is etched to form an upper $Al_2O_3$ film. An upper shield (doubling as a lower write head) 80 is formed and flattened by etching back. Further, an $Al_2O_3$ gap film 120 is formed, followed by a write head core, an interlayer insulating film, an upper magnetic core 130 and an $Al_2O_3$ protective film, thus constituting an electrode terminal not shown. The resulting assembly is subjected to a magnetization heat treatment by being held at 230° C. for 30 minutes and is cooled in a magnetic field, in order to maintain a constant magnetic exchange coupling between NiO and Ni—Fe.

Figure 8:
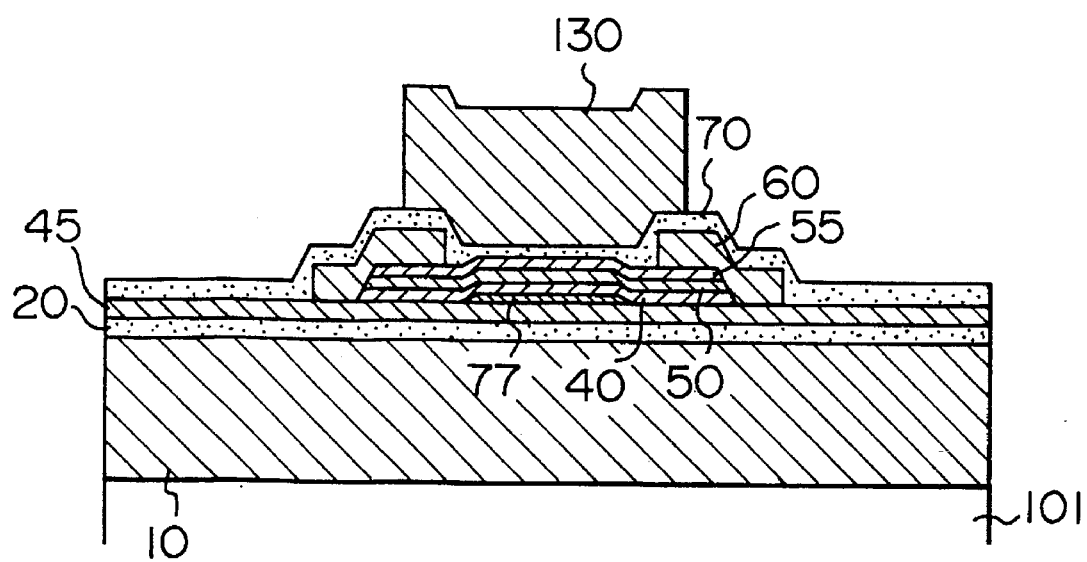
FIG. 8 is a diagram showing an air-bearing surface of a head of in-gap type according to an embodiment of the present invention.

Further, as shown in FIG. 8, the MR head may also be formed in the recording head gap by omitting the upper shield 80. In such a case, the problem of yaw angle is eliminated completely, and the coincidence between the width of the recording head track and that of the reproduction head track is attained, leading to an increased reproduction output and hence a further improved linear recording density. Nevertheless, the galvanization process is required in order to protect the magneto-resistance effect film and the electrode film from shocks in forming a recording head magnetic core. The magnetic core may be formed alternatively by use of the lift-off process and sputtering of a soft magnetic film of Ni—Fe or the like at low temperatures. In such a case, sputtering of an oxide such as $Z_rO_2$ on Ni—Fe permits a soft magnetic characteristic to be held even for a film formed at room temperature. An isolation film can be formed selectively by lift-off, in which case variations in magnetic coupling at the NiO/MR contact are reduced. The isolation film is preferably made of $Al_2O_3$, or non-magnetic material such as $SiO_2$, $TaO_2$ or $TiO_2$, a nitride such as SiN, AlN, or a metal or alloy β—Ta, Ni—Cr or the like of high electrical resistance. Further, the isolation film is preferably as thin as possible as far as no magnetic coupling develops between the MR film and the magnetic domain control film to reduce the misalignment with the MR film and to prevent the generation of a ferromagnetic domain wall. The magnetic domain control film may be comprised of such an antiferromagnetic material as NiO, Fe—Mn or Ni—Mn alloy or a magnet material such as $Fe_2O_3$, Co—Pt or Co—Cr. In order not to reduce the shunt ratio of the sense current to the MR film, however, it is necessary to use an insulating material or a metal film as thin as possible.

The write head needs not be a thin-film magnetic head but may be a combination with a ferrite head or a MIG (Metal-In-Gap) head. In such a case, it is advantageous from the viewpoint processing temperature to form an MR head on a MIG head gap already formed. Ferrite may double as a shield. Further, the MR sensor according to the present invention may be used as a magnetic-flux sensor of the yoke-type MR head.

Figure 9:
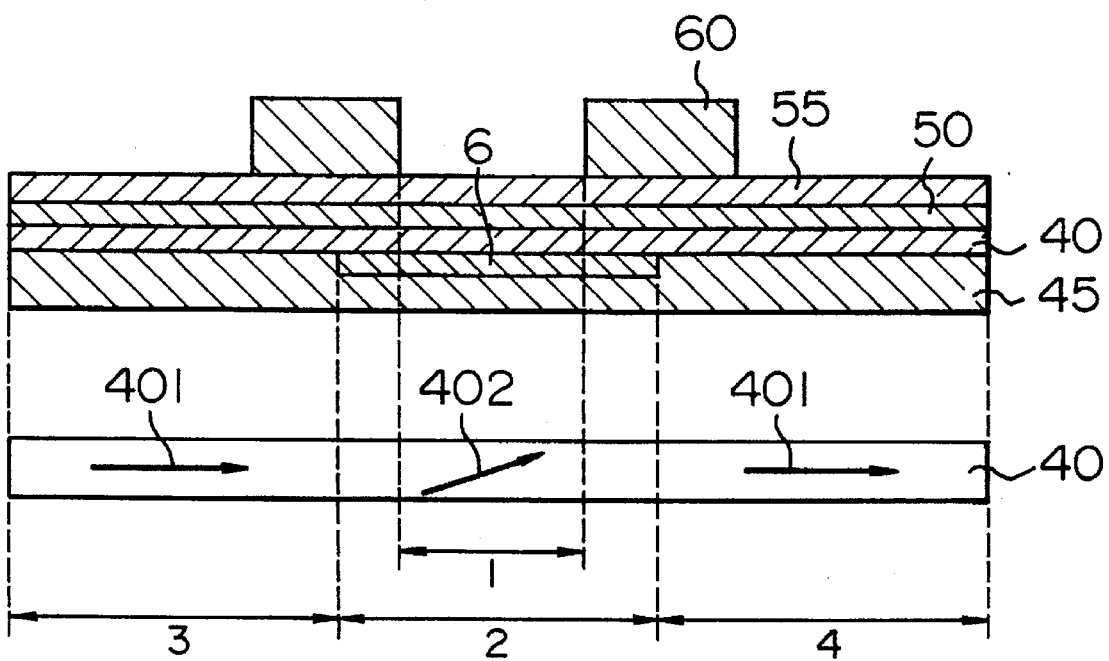
FIG. 9 is a diagram showing an air-bearing surface of a head of ion-implantation type according to an embodiment of the present invention.

An air-bearing surface of the MR reproduction head according to another embodiment of the present invention is shown in FIG. 9. A magnetic domain control film 45 is constructed of NiO of 100 nanometers in thickness, and an alteration layer 6 is formed by implanation of N ions into the NiO surface. It is known that the NiO crystal lattice is ruptured and no antiferroamgnetism is exhibited at this portion. An MR film 40, an Nb shunted film 50 and a soft magnetic film 55 are formed on the resulting assembly to produce a magnetic head by the same process as in the first embodiment. The width of the alteration layer is 6 micrometers, and that of the electrode 8.1 micrometers. Implantation materials used include such light elements as N, O, Cl, Ar, Ne, He or C or gas atoms or such elements as Nb, Ti, Ta, Al or Si which are easily oxidated. In the case of implantation of an easy-to-oxydate element, the oxygen of NiO is fixed by the particular element and oxygen transfer to the MR film is prevented, thus minimizing magnetorestriction of the MR film. According to the present embodiment, as in the first embodiment, the magnetic domain control film 45 may be made of such as magnet material as Co—Pt, in which case an alteration layer may be formed by selective oxidation of the surface.

FIGS. 10 and 11 show an example of configuration of the electrode and end of the window according to another embodiment of the present invention. The configuration shown in FIG. 10 is the same as the conventional one, with an electrode disposed on an isolation film, although the isolation film length 2 is larger than the electrode length 1. The optimum relation between the isolation film length 2 and the electrode interval 1 depends on the magnetorestriction constant and the stress of the magneto-resistance effect film. To the extent that the difference between 1 and 2 is not more than 2 micrometers, however, the Barkhausen noise can be suppressed stably over a wide range of film compositions and configurations. This is due to the fact that the restrictions of a magnetic domain control film penetrates by at least about 1 micrometer along the length of the magneto-resistance effect film. This fact necessitates an isolation film length of 2 micrometers in minimum. By contrast, the electrode interval is larger than the isolation film length 2 in FIG. 11, and therefore there is no special relation between the factors 1 and 2 in terms of Barkhausen noise. In this case, the width of the reproduction track is determined by the length 2. If the length 1 is excessively large, however, the ineffective length of the magneto-resistance effect film increases with respect to the factor 2, providing an effective track width, and the resulting increase in resistance value is disadvantageous in terms of signal-to-noise ratio. Nevertheless, the configuration shown in FIG. 11 is such that the isolation film and the electrode film are not overlaid on each other, and therefore the whole film thickness is reduced, thereby leading to the advantage of a smaller gap length. As a compromise method between FIGS. 10 and 11, an electrode may ride over the isolation film. In the last case, the track width is determined by the electrode or the magnetic domain control film, whichever is nearer to the center of the magneto-sensitive portion.

Figure 12A:
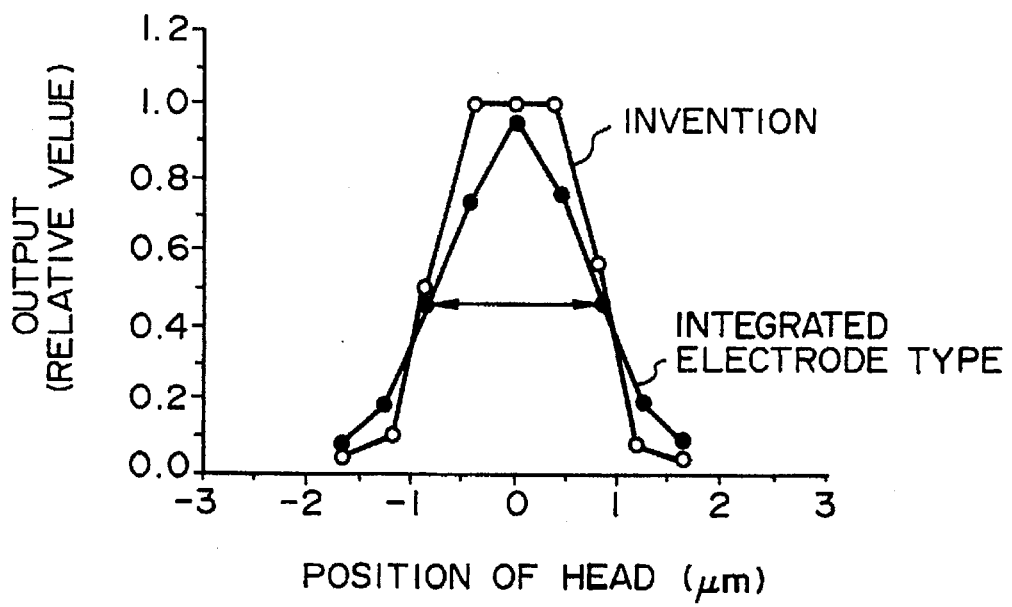
FIGS. 12A, 12B and 12C are diagrams for comparing the off-track characteristics of a conventional head and a head according to the present invention.
Figure 12B:
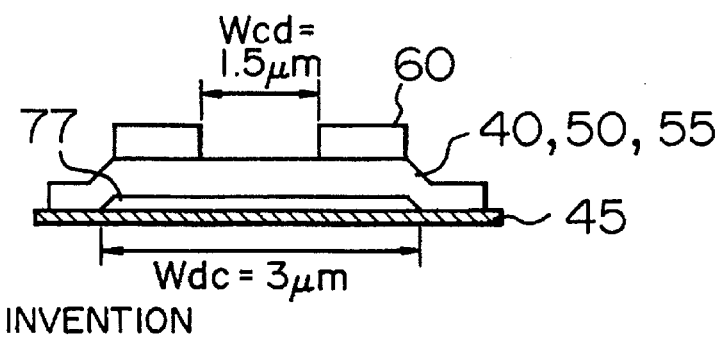
Figure 12C:
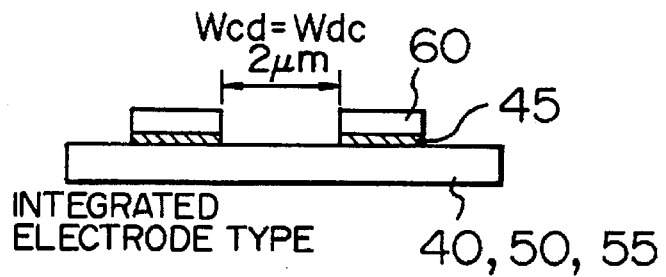

The off-track characteristic of a head (FIG. 12B) according to an embodiment of the present invention is shown in FIG. 12A. The off-track characteristic is determined by writing a 0.3-micrometer microtrack and reproduced with MR head while being displacing the head along the disc radius and reading an output value. The head output is represented by the output value shown integrated along the direction of head displacement. In a conventional head of integrated electrode-magnetic domain control type (FIG. 12C), a track width of 2 micrometers requires a track sensitivity distribution as shown, resulting in an output considerably reduced as compared with a wide track. This is in view of the fact that magnetization rotation-restricted area at the ends of the magnetic domain control film covers the entire magneto-sensitive portion, thereby reducing the magnetic permeability. According to the present invention, by contrast, the sensitivity distribution in the magneto-sensitive portion is rendered uniform with an output about 40% larger than the integrated type by setting the length of magnetic domain control film to 3 micrometers and the electrode interval to 1.5 micrometers.

Figure 13A:
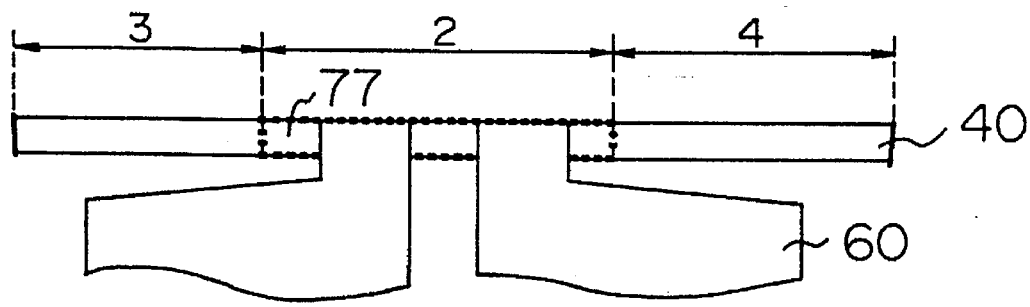
FIGS. 13A and 13B are diagrams showing the result of observation of a magnetic domain of a head according to the present invention.
Figure 13B:
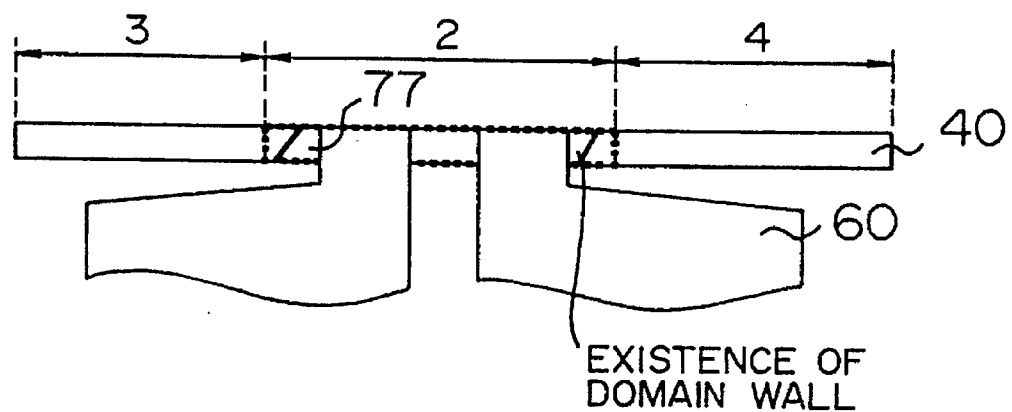

FIGS. 13A and 13B show the isolation film thickness and the magnetic domain controllability as determined by observation of a magnetic domain structure of the magneto-sensitive portion by the powder drawing method. In FIG. 13B, the thickness of the isolation film or spaces is 40 nanometers after applying 10 KOe along the axis of difficult magnetization. In FIG. 13A, magnetic powder is not concentrated due to a ferromagnetic domain wall or the like other than by a magnetic pole at the ends of a magnetic domain control film, whereas a ferromagnetic domain wall is observed in FIG. 13B. This is considered due to the fact that the magnetic exchange coupling in the parts 4 and 5 of the magneto-resistance effect film 40 which have formed a single magnetic domain by magnetization coupling of the magnetic domain control film or the like, are discontinued losing the magnetic domain controllability by a misalignment with the isolation film thickness of 40 nanometers. A study shows that the isolation film thickness is required to be 30 nanometers or less. FIG. 13A shows a spacer thickness of 10 nanometers after applying 10 KOe along the axis of difficult magnetization.

Figure 14A:
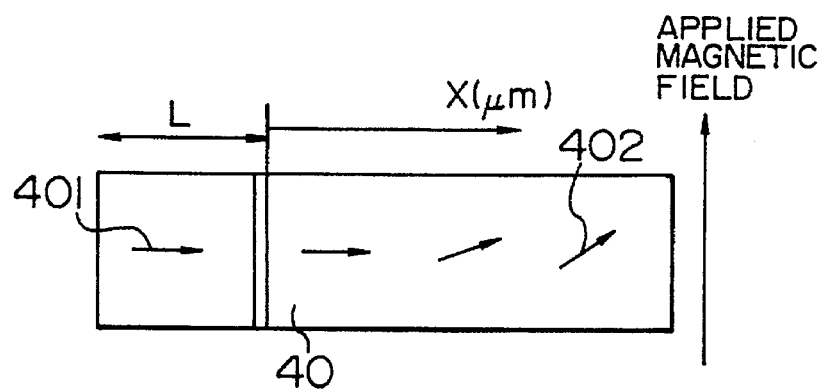
FIGS. 14A, 14B and 14C are diagrams useful for explaining the propagation of exchange coupling in the direction along the length of a magneto-resistance effect film.
Figure 14B:
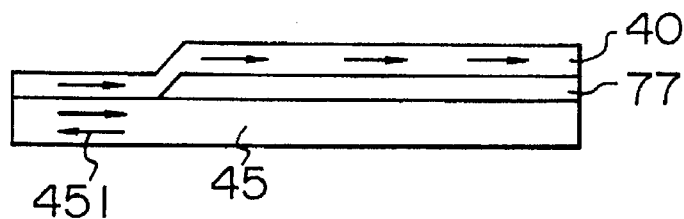
Figure 14C:
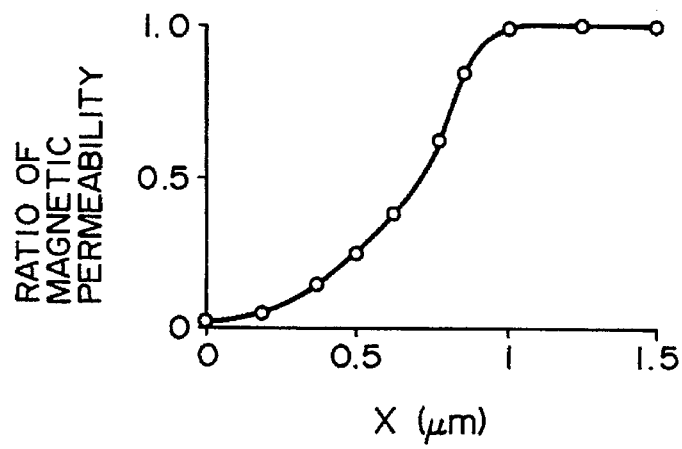

The present invention is so configured that the magneto-resistance effect film 40 and the magnetic domain control layer 45 are in direct contact with each other at the ends of the magneto-resistance effect film 40, and a strong vertically biassing magnetic field is applied to the magneto-resistance effect film 40 in this area. In this layer configuration, the magnitude of effective vertically biassing magnetic field applied to the magneto-sensitive portion varies with the distance from the magneto-sensitive portion to the end where the magneto-resistance effect film 40 is in direct contact with the magnetic domain control layer 45. The shorter this distance, the larger the magnitude of the effective vertically biassing magnetic field. This indicates that the magnetic permeability of the magneto-resistance effect film substantially decreases steadily toward the ends. FIGS. 14A, 14B and 14C show the distance from the ends as related to the permeability of a magneto-resistance effect film. The magnetic permeability is seen to decrease to about one micrometer from the ends. If the vertically biassing magnetic field is to be reduced to a range where the Barkhause noise can be alleviated in order to improve the magnetic response characteristic of a magnetic head of magneto-resistance effect type sufficiently, the length in which the ends of an isolation affect each other is a low limit of the isolation film length. As seen from the drawings, the magnetic permeability at the center is less than 10% for the length of 0.5 micrometers on one side and is practically of no use. This indicates that the isolation film is required to be at least one micrometer in length.

According to the present invention, a magnetic head of magneto-resistance effect type for high-density magnetic recording which is noiseless and capable of high output is realized.

Further, the present invention realizes a noiseless, high-output magnetic head of magneto-resistance effect type in which performance variations of the magnetic head of magneto-resistance effect type is suppressed.

We claim:

1. A magnetic disc apparatus comprising a magnetic head of magneto-resistance effect type including:

a magneto-resistance effect film for converting a magnetic signal into an electrical signal by use of the magneto-resistance effect, said magneto-resistance effect film being a ferromagnetic film in which an electrical resistance thereof changes in accordance with a direction of magnetization;

a pair of electrodes for supplying a signal detection current to said magneto-resistance effect film; and a magnetic domain control layer of antiferromagnetic material for controlling the magnetic domain of said magneto-resistance effect film;

said magnetic disc apparatus comprising said magnetic head of magneto-resistance effect type further including an isolation film of a non-magnetic material formed in a magneto-sensitive portion of said magneto-resistance effect film between said magneto-resistance effect film and said magnetic domain control layer and in contact with said magneto-resistance effect film and said magnetic domain control layer for breaking the magnetic coupling between said magneto-resistance effect film and said magnetic domain control layer, and a ferromagnetic film having a soft magnetic characteristic for applying a laterally biasing magnetic field to said magneto-resistance effect film being provided at an opposite side of said magneto-resistance effect film from that of said magnetic domain control layer of antiferromagnetic material so that said magneto-resistance effect film is disposed between said magnetic domain control layer of antiferromagnetic material and said ferromagnetic film having the soft magnetic characteristic.

2. A magnetic disc apparatus according to claim 1, wherein said magnetic head of magneto-resistance effect type is disposed for reproducing a signal by a reproduction track of 0.5 to 2.0 μm.

3. A magnetic disc apparatus according to claim 1, wherein said magneto-resistance effect film enables sensing an external magnetization and changing the direction of magnetization, and a track for reproduction is determined in an area having a larger permeability of said magneto-resistance effect film than in a portion subjected to magnetic domain control.

4. A magnetic disc apparatus according to claim 1, further comprising a magnetic disc for storing a magnetic signal recorded therein by a recording track of 6.0 to 3.5 μm, said magnetic head being disposed for reproducing said magnetic signal by a reproduction track of 3.0 to 0.5 μm, the recording track of said magnetic disc apparatus being smaller than the reproduction track thereof.

5. A magnetic disc apparatus according to claim 1, wherein said pair of electrodes enable reproducing a magnetic signal recorded on a magnetic disc, a width of a reproduction track is determined between said electrodes and the reproduction sensitivity between said electrodes is substantially uniform.

6. A magneto disc apparatus according to claim 1, wherein said magnetic domain control layer is made of an antiferromagnetic nickel oxide, and said magnetic domain control layer, isolation film, magneto-resistance effect film and electrodes are sequentially formed in that order on a substrate.

7. A magnetic disc apparatus according to claim 6, wherein said isolation layer is made of one of $Al_2O_3$, $S_1O_2$, $T_1O_2$, $HfO_2$ and $ZrO_2$.

8. A magnetic disc apparatus comprising a magnetic head of magneto-resistance effect type including:

a magneto-resistance effect film for sensing an external magnetization and changing the direction of magnetization, said magneto-resistance effect film being a ferromagnetic film in which an electrical resistance thereof changes in accordance with the direction of magnetization;

a pair of electrodes for supplying a current to said magneto-resistance effect film; and a magnetic domain control layer of antiferromagnetic material for controlling the magnetic domain of said magneto-resistance effect film;

said magnetic disc apparatus comprising said magnetic head of magneto-resistance effect type further including a non-magnetic film formed narrower than the length of said magneto-resistance effect film and wider than the interval of said electrodes between said magneto-resistance effect film and said magnetic domain control layer and in contact with said magneto-resistance effect film and said magnetic domain control layer for breaking the magnetic coupling between said magneto-resistance effect film and said magnetic domain control layer, and a ferromagnetic film having a soft magnetic characteristic for applying a laterally biasing magnetic field to said magneto-resistance effect film being provided at an opposite side of said magneto-resistance effect film from that of said magnetic domain control layer of antiferromagnetic material so that said magneto-resistance effect film is disposed between said magnetic domain control layer of antiferromagnetic material and said ferromagnetic film having the soft magnetic characteristic.

9. A magnetic disc apparatus comprising a thin-film dual magnetic head including a reproduction head and a recording head:

said reproduction head including a magneto-resistance effect film for converting a magnetic signal into an electrical signal by use of the magneto-resistance effect, said magneto-resistance effect film being a ferromagnetic film in which an electrical resistance thereof changes in accordance with a direction of magnetization, a pair of electrodes for supplying a signal detection current to said magneto-resistance effect film, and a magnetic domain control layer of antiferromagnetic material for controlling the magnetic domain of said magneto-resistance effect film;

said recording head including a first magnetic pole, a second magnetic pole in contact with one side of said first magnetic pole and forming a gap with the other side of said first magnetic pole, and a coil wound between said magnetic poles, said recording head converting the current flowing in said coil into a magnetization;

said magnetic disc apparatus comprising said thin dual magnetic head basically including said reproduction head and said recording head further including an isolation film of a non-magnetic material disposed between said magneto-resistance effect film and said magnetic domain control layer and in contact with said magnetic-resistance effect film and said magnetic domain control layer for breaking the magnetic coupling between said magneto-resistance effect film and said magnetic domain control layer, said isolation film having a length of at least 1 µm and being smaller than a track width of said recording head and a ferromagnetic film having a soft magnetic characteristic for applying a laterally biasing magnetic field to said magneto-resistance effect film being provided at an opposite side of said magneto-resistance effect film from that of said magnetic domain control layer of antiferromagnetic material so that said magneto-resistance effect film is disposed between said magnetic domain control layer of antiferromagnetic material and said ferromagnetic film having the soft magnetic characteristic.

10. A magneto disc apparatus according to claim 9, wherein said magnetic domain control layer is made of an antiferromagnetic nickel oxide, and said magnetic domain control layer, isolation film, magneto-resistance effect film and electrodes are sequentially formed in that order on a substrate.

11. A magnetic disc apparatus according to claim 10, wherein said isolation layer is made of one of $Al_2O_3$, $S_1O_2$, $T_1O_2$, $HfO_2$ and $ZrO_2$.

12. A magnetic disc apparatus comprising a magnetic head of magneto-resistance effect type including:

a magneto-resistance effect film for converting a magnetic signal into an electrical signal by use of the magneto-resistance effect, said magneto-resistance effect film being a ferromagnetic film in which an electrical resistance thereof changes in accordance with a direction of magnetization;

a pair of electrodes for supplying a signal detection current to said magneto-resistance effect film; and a magnetic domain control layer of antiferromagnetic material for controlling the magnetic domain of said magneto-resistance effect film;

said magnetic disc apparatus comprising said magnetic head of magneto-resistive effect type further including an alteration layer as a paramagnetized magnetic domain control layer in a part of the interface of said magnetic domain control layer in contact with said magneto-resistance effect film and said magnetic domain control layer, and a ferromagnetic film having a soft magnetic characteristic for applying a laterally biasing magnetic field to said magneto-resistance effect film being provided at an opposite side of said magneto-resistance effect film from that of said magnetic domain control layer of antiferromagnetic material so that said magneto-resistance effect film is disposed between said magnetic domain control layer of antiferromagnetic material and said ferromagnetic film having the soft magnetic characteristic.

13. A magnetic disc apparatus according to claim 12, wherein said magnetic domain control layer is in direct contact with said magneto-resistance effect film at portions other than said alteration layer.

14. A magnetic disc apparatus according to claim 12, wherein said magnetic domain control layer is made of an antiferromagnetic nickel oxide.

15. A magnetic disc apparatus comprising a magnetic head of magneto-resistance effect type including:
   a magneto-resistance effect film for converting a magnetic signal into an electric signal by use of the magneto-resistance effect, said magneto-resistance effect film being a ferromagnetic film in which an electrical resistance thereof changes in accordance with a direction of magnetization;
   a pair of electrodes for supplying the signal detection current to said magneto-resistance film; and
   a magnetic domain control layer of antiferromagnetic material for applying a vertically biasing magnetic field to said magneto-resistance effect film;
   said magnetic disc apparatus comprising said magnetic head of magneto-resistance effect type further including an isolation film of a non-magnetic material formed in a magneto-sensitive portion of said magneto-resistance effect film between said magneto-resistance effect film and said magnetic domain control layer and in contact with said magneto-resistance effect film and said magnetic domain control layer for breaking the magnetic coupling between said magneto-resistance effect film and said magnetic domain control layer, and a ferromagnetic film having a soft magnetic characteristic for applying a laterally biasing magnetic field to said magneto-resistance effect film being provided at an opposite side of said magneto-resistance effect film from that of said magnetic domain control layer of antiferromagnetic material so that said magneto-resistance effect film is disposed between said magnetic domain control layer of antiferromagnetic material and said ferromagnetic film having the soft magnetic characteristic.

16. A magnetic disc apparatus according to claim 15, wherein said magnetic domain control layer is made of said antiferromagnetic material of NiO.

17. A magnetic disc apparatus comprising a magnetic head of magneto-resistance effect type including:
   a magneto-resistance effect film for converting a magnetic signal into an electrical signal by use of the magneto-resistance effect;
   a pair of electrodes for supplying a signal detection current to said magneto-resistance effect film; and
   a magnetic domain control layer of antiferromagnetic material for applying a vertical biasing magnetic field to said magnetic-resistance effect film;
   said magnetic disc apparatus comprising said magnetic head of magneto-resistance effect type further including an isolation film disposed on said magnetic domain control layer at a portion thereof corresponding to the central part of said magneto-resistance effect film to remove magnetic coupling between said magnetic domain control layer and magneto-resistance effect film, said magneto-resistance effect film being disposed covering both said isolation film and end portions of said isolation film where no isolation film is disposed, so as to create regions where said magnetic domain control layer and magneto-resistance effect film are in direct contact with each other at said end portions of said isolation film, and a ferromagnetic film having a soft magnetic characteristic for applying a laterally biasing magnetic field to said magneto-resistance effect film being provided at an opposite side of said magneto-resistance effect film from that of said magnetic domain control layer of antiferromagnetic material so that said magneto-resistance effect film is disposed between said magnetic domain control layer of antiferromagnetic material and said ferromagnetic film having the soft magnetic characteristic.

18. A magnetic disc apparatus according to claim 17, wherein said magnetic domain control layer and magneto-resistance effect film are magnetically coupled with each other.

19. A magnetic disc apparatus according to claim 17, wherein said antiferromagnetic material includes NiO.

20. A magnetic disc apparatus comprising a magnetic head of magneto-resistance effect type including:
   a magneto-resistance effect film for converting a magnetic signal into an electrical signal by use of the magneto-resistance effect film; and
   a magnetic domain control layer of antiferromagnetic material for applying a vertical biasing magnetic field to said magneto-resistance film;
   said magnetic disc apparatus comprising said magnetic head of magneto-resistance effect type further including an isolation film disposed on said magnetic domain control layer at a portion thereof corresponding to the central part of said magneto-resistance effect film to remove magnetic coupling between said magnetic domain control layer and magneto-resistance effect film, said magneto-resistance effect film being disposed covering both said isolation film and end portions of said isolation film where no isolation film is disposed, so as to create regions where said magnetic domain control layer and magneto-resistance effect film are magnetically coupled with each other at said end portions of said isolation film, and a ferromagnetic film having a soft magnetic characteristic for applying a laterally biasing magnetic field to said magneto-resistance effect film being provided at an opposite side of said magneto-resistance effect film from that of said magnetic domain control layer of antiferromagnetic material so that said magneto-resistance effect film is disposed between said magnetic domain control layer of antiferromagnetic material and said ferromagnetic film having the soft magnetic characteristic.

21. A magnetic disc apparatus according to claim 20, wherein said magnetic domain control layer and said magneto-resistance effect film are in direct contact with each other.

22. A magnetic disc apparatus according to claim 20, wherein said antiferromagnetic material includes NiO.

23. A magnetic disc apparatus comprising a magnetic head of magneto-resistance effect type including:
   a magneto-resistance effect film for sensing an external magnetization and changing the direction of magnetization, said magneto-resistance effect film being a ferromagnetic film in which an electrical resistance thereof changes in accordance with the direction of magnetization;
   a pair of electrodes for supplying a current to said magneto-resistance effect film; and
   a magnetic domain control layer of antiferromagnetic material for controlling the magnetic domain of said magneto-resistance effect film; and
   said magnetic disc apparatus comprising said magnetic head of magneto-resistance effect type further including a non-magnetic film formed narrower than the length of said magneto-resistance effect film and narrower than the interval of said electrodes between said magneto-resistance effect film and said magnetic domain control layer, and a ferromagnetic film having a soft magnetic characteristic for applying a laterally biasing magnetic field to said magneto-resistance effect film being provided at an opposite side of said magneto-resistance effect film from that of said magnetic domain control layer of antiferromagnetic material so that said magneto-resistance effect film is disposed between said magnetic domain control layer of antiferromagnetic material and said ferromagnetic film having the soft magnetic characteristic.

24. A magnetic disc apparatus comprising a magnetic head of magneto-resistance effect type including:

a magneto-resistance effect film for converting a magnetic signal into an electrical signal by use of the magneto-resistance effect, said magneto-resistance effect film being a ferromagnetic film in which an electrical resistance thereof changes in accordance with a direction of magnetization;

a pair of electrodes for supplying a signal detection current to said magneto-resistance effect film; and a magnetic domain control layer of antiferromagnetic material for controlling the magnetic domain of said magneto-resistance effect film;

said magnetic disc apparatus comprising said magnetic head of magneto-resistance effect type further including an isolation film of a non-magnetic material formed in a magneto-sensitive portion of said magneto-resistance effect film between said magneto-resistance effect film and said magnetic domain control layer and in contact with said magneto-resistance effect film and said magnetic domain control layer for breaking the magnetic coupling between said magneto-resistance effect film and said magnetic domain control layer, and at least one of a shunt film and a soft film, said shunt film being made of a non-magnetic metal film disposed in contact with said magneto-resistance effect film so as to apply a lateral biasing magnetic field to said magneto-resistance effect film, said soft film being made of a ferromagnetic film having a soft magnetic characteristic formed through a non-magnetic layer.

25. A magnetic disc apparatus comprising a magnetic head of magneto-resistance effect type including:

a magneto-resistance effect film for sensing an external magnetization and changing the direction of magnetization, said magneto-resistance effect film being a ferromagnetic film in which an electrical resistance thereof changes in accordance with the direction of magnetization;

a pair of electrodes for supplying a current to said magneto-resistance effect film; and a magnetic domain control layer of antiferromagnetic material for controlling the magnetic domain of said magneto-resistance effect film;

said magnetic disc apparatus comprising said magnetic head of magneto-resistance effect type further including a non-magnetic film formed narrower than the length of said magneto-resistance effect film and wider than the interval of said electrodes between said magneto-resistance effect film and said magnetic domain control layer and in contact with said magneto-resistance effect film and said magnetic domain control layer, at least one of a shunt film and a soft film, said shunt film being made of a non-magnetic metal film disposed in contact with said magneto-resistance effect film so as to apply a lateral biasing magnetic field to said magneto-resistance effect film, said soft film being made of a ferromagnetic film having a soft magnetic characteristic formed through a non-magnetic layer.

26. A magnetic disc apparatus comprising a magnetic head of magneto-resistance effect type including:

a magneto-resistance effect film for converting a magnetic signal into an electric signal by use of the magneto-resistance effect, said magneto-resistance effect film being a ferromagnetic film in which an electrical resistance thereof changes in accordance with a direction of magnetization;

a pair of electrodes for supplying the signal detection current to said magneto-resistance film; and a magnetic domain control layer of antiferromagnetic material for applying a vertically biasing magnetic field to said magneto-resistance effect film;

said magnetic disc apparatus comprising said magnetic head of magneto-resistance effect type further including an isolation film of a non-magnetic material formed in a magneto-sensitive portion of said magneto-resistance effect film between said magneto-resistance effect film and said magnetic domain control layer and in contact with said magneto-resistance effect film and said magnetic domain control layer for breaking the magnetic coupling between said magneto-resistance effect film and said magnetic domain control layer, at least one of a shunt film and a soft film, said shunt film being made of a non-magnetic metal film disposed in contact with said magneto-resistance effect film so as to apply a lateral biasing magnetic field to said magneto-resistance effect film, said soft film being made of a ferromagnetic film having a soft magnetic characteristic formed through a non-magnetic layer.

27. A magnetic disc apparatus comprising a magnetic head of magneto-resistance effect type including:

a magneto-resistance effect film for converting a magnetic signal into an electrical signal by use of the magneto-resistance effect, said magneto-resistance effect film being a ferromagnetic film in which an electrical resistance thereof changes in accordance with a direction of magnetization;

a pair of electrodes for supplying a signal detection current to said magneto-resistance effect film; and a magnetic domain control layer of antiferromagnetic material for controlling the magnetic domain of said magneto-resistance effect film;

said magnetic disc apparatus comprising said magnetic head of magneto-resistive effect type further including an alteration layer as a paramagnetized magnetic domain control layer in a part of the interface of said magnetic domain control layer in contact with said magneto-resistance effect film and said magnetic domain control layer, at least one of a shunt film and a soft film, said shunt film being made of a non-magnetic metal film disposed in contact with said magneto-resistance effect film so as to apply a lateral biasing magnetic field to said magneto-resistance effect film, said soft film being made of a ferromagnetic film having a soft magnetic characteristic formed through a non-magnetic layer.

28. A magnetic disc apparatus comprising a magnetic head of magneto-resistance effect type including:

a magneto-resistance effect film for converting a magnetic signal into an electric signal by use of the magneto-resistance effect, said magneto-resistance effect film being a ferromagnetic film in which an electrical resistance thereof changes in accordance with a direction of magnetization;

a pair of electrodes for supplying the signal detection current to said magneto-resistance film; and a magnetic domain control layer of antiferromagnetic material for applying a vertically biasing magnetic field to said magneto-resistance effect film;

said magnetic disc apparatus comprising said magnetic head of magneto-resistance effect type further including an isolation film of a non-magnetic material formed in a magneto-sensitive portion of said magneto-resistance effect film between said magneto-resistance effect film and said magnetic domain control layer and in contact with said magneto-resistance effect film and said magnetic domain control layer for breaking the magnetic coupling between said magneto-resistance effect film and said magnetic domain control layer, at least one of a shunt film and a soft film, said shunt film being made of a non-magnetic metal film disposed in contact with said magneto-resistance effect film so as to apply a lateral biasing magnetic field to said magneto-resistance effect film, said soft film being made of a ferromagnetic film having a soft magnetic characteristic formed through a non-magnetic layer.

29. A magnetic disc apparatus comprising a magnetic head of magneto-resistance effect type including:

a magneto-resistance effect film for converting a magnetic signal into an electrical signal by use of the magneto-resistance effect;

a pair of electrodes for supplying a signal detection current to said magneto-resistance effect film; and a magnetic domain control layer of antiferromagnetic material for applying a vertical biasing magnetic field to said magnetic-resistance effect film;

said magnetic disc apparatus comprising said magnetic head of magneto-resistance effect type further including an isolation film disposed on said magnetic domain control layer at a portion thereof corresponding to the central part of said magneto-resistance effect film to remove magnetic coupling between said magnetic domain control layer and magneto-resistance effect film, said magneto-resistance effect film being posed covering both said isolation film and end portions of said isolation film where no isolation film is disposed, so as to create regions where said magnetic domain control layer and magneto-resistance effect film are in direct contact with each other at said end portions of said isolation film, at least one of a shunt film and a soft film, said shunt film being made of a non-magnetic metal film disposed in contact with said magneto-resistance effect film so as to apply a lateral biasing magnetic field to said magneto-resistance effect film, said soft film being made of a ferromagnetic film having a soft magnetic characteristic formed through a non-magnetic layer.

30. A magnetic disc apparatus comprising a magnetic head of magneto-resistance effect type including:

a magneto-resistance effect film for converting a magnetic signal into an electrical signal by use of the magneto-resistance effect film; and a magnetic domain control layer of antiferromagnetic material for applying a vertical biasing magnetic field to said magneto-resistance film;

said magnetic disc apparatus comprising said magnetic head of magneto-resistance effect type further including an isolation film disposed on said magnetic domain control layer at a portion thereof corresponding to the central part of said magneto-resistance effect film to remove magnetic coupling between said magnetic domain control layer and magneto-resistance effect film, said magneto-resistance effect film being disposed covering both said isolation film and end portions of said isolation film where no isolation film is disposed, so as to create regions where said magnetic domain control layer and magneto-resistance effect film are magnetically coupled with each other at said end portions of said isolation film, at least one of a shunt film and a soft film, said shunt film being made of a non-magnetic metal film disposed in contact with said magneto-resistance effect film so as to apply a lateral biasing magnetic field to said magneto-resistance effect film, said soft film being made of a ferromagnetic film having a soft magnetic characteristic formed through a non-magnetic layer.

* * * * *